(12) United States Patent
Takayama et al.

(10) Patent No.: US 7,042,821 B2
(45) Date of Patent: May 9, 2006

(54) DISK DRIVE APPARATUS FOR OPTIMUM MOTOR CONTROL

(75) Inventors: Seiryu Takayama, Kanagawa (JP); Ryo Ando, Tokyo (JP); Takao Maruyama, Kanagawa (JP)

(73) Assignee: Sony Corporation, (JP)

(*) Notice: Subject to any disclaimer, the term of this patent is extended or adjusted under 35 U.S.C. 154(b) by 517 days.

(21) Appl. No.: 10/145,727

(22) Filed: May 16, 2002

(65) Prior Publication Data

US 2002/0186631 A1    Dec. 12, 2002

(30) Foreign Application Priority Data

Jun. 7, 2001 (JP) ............................ P2001-173274
Jun. 26, 2001 (JP) ............................ P2001-193732

(51) Int. Cl.
*G11B 7/00* (2006.01)
(52) U.S. Cl. .................................................. 369/47.45
(58) Field of Classification Search ............. 369/47.45, 369/47.55, 47.42, 53.3
See application file for complete search history.

(56) References Cited

U.S. PATENT DOCUMENTS

| 5,627,441 | A | * | 5/1997 | Sakurai et al. ............... 318/599 |
| 6,153,989 | A | * | 11/2000 | Kardash et al. ............. 318/254 |
| 6,242,875 | B1 | * | 6/2001 | Kusaka et al. ............. 318/254 |
| 6,437,525 | B1 | * | 8/2002 | Menegoli ..................... 318/254 |
| 6,555,985 | B1 | * | 4/2003 | Kawabata et al. .......... 318/685 |

* cited by examiner

*Primary Examiner*—William Klimowicz
*Assistant Examiner*—Linh Nguyen
(74) *Attorney, Agent, or Firm*—Rader, Fishman, & Grauer PLLC; Ronald P. Kananen

(57) ABSTRACT

A disk drive apparatus drives, by means of a motor, a disk mounted thereon so as to reproduce signals recorded in the disk. The disk drive apparatus has an edge detecting unit for generating an edge signal XEG indicating a timing of phase switching, in accordance with a plurality of signals CU, CV and CW induced when the motor is driven. The disk drive apparatus further has a drive voltage controlling unit for controlling, in accordance with the edge detection signal XEG, the maximum value of a drive voltage VS for driving said motor. This arrangement implements optimal motor control, while reducing circuit scale and cost and, at the same time, enhancing adaptability of the disk drive apparatus.

6 Claims, 20 Drawing Sheets

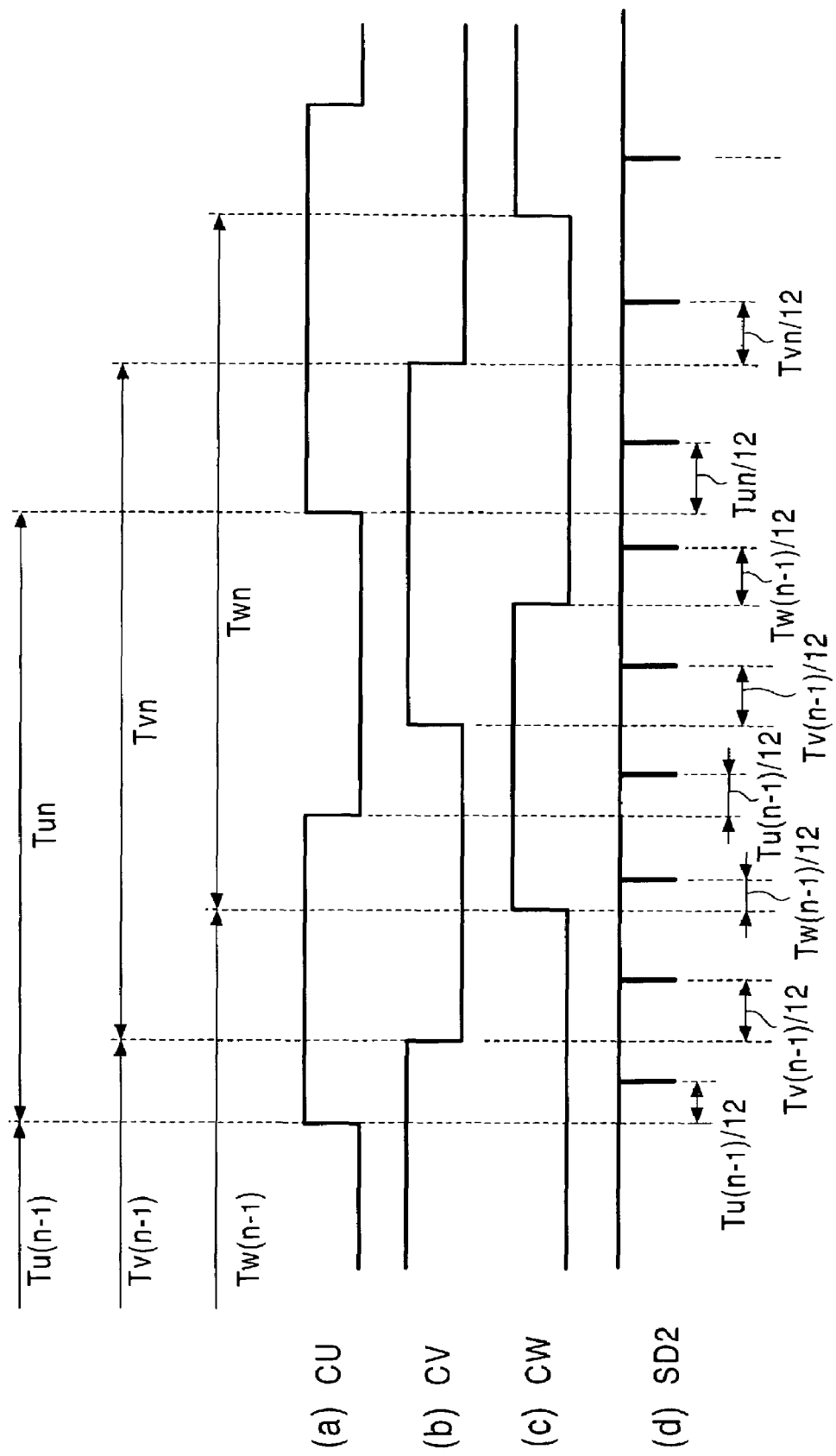

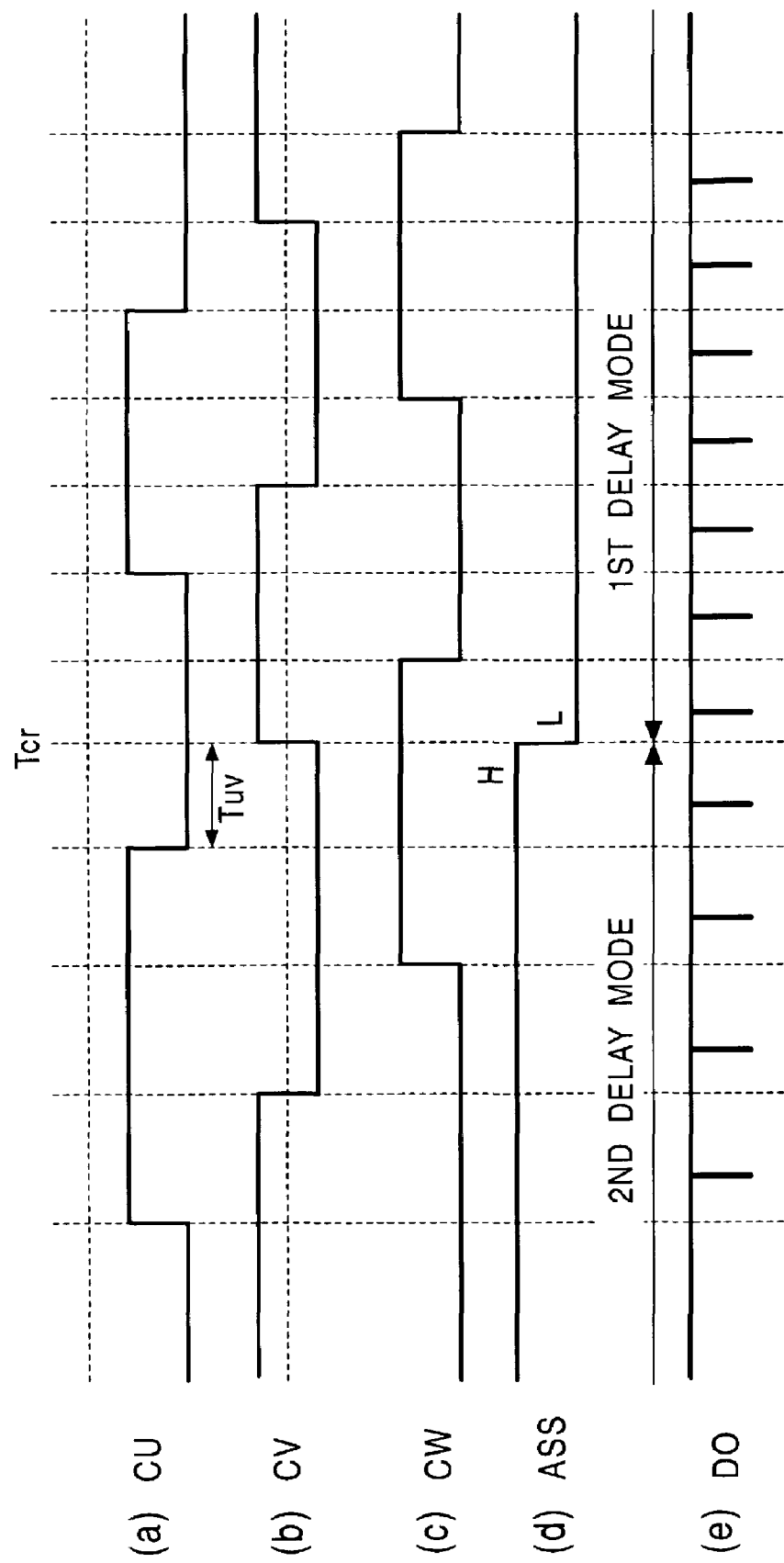

DISK DRIVE APPARATUS FOR OPTIMUM MOTOR CONTROL

BACKGROUND OF THE INVENTION

1. Field of the Invention

The present invention relates to a disk drive apparatus for driving a disk mounted thereon to allow signals recorded in the disk to be reproduced.

2. Description of the Related Art

In systems having rotary components, such as portable MD players, noise produced by a spindle motor incorporated in the rotary component is becoming a matter of concern. In a system known as a PWM system in which a spindle motor is driven directly by a pulse-width-modulated signal, a problem also is caused by noise that is generated by a quick variation in electric current occurring at the time of switching of the phase of the electric current.

In order to obviate this problem, a technique known as the "soft-switching" driving or control method has been proposed in which the motor current is reduced immediately before and after a phase switch of the spindle motor.

Such a soft-switching driving method has been implemented by using an analog circuit. The analog circuit is composed of transistors included in a motor driver and, therefore, cannot be formed with a high degree of integration, thus failing to contribute to an appreciable reduction in the cost.

The known circuit implementing the soft-switching driving method involves another problem in that changes or modifications of parameters concerning the driving system by using an external device, such as a microcomputer (MCU), cannot easily be effected because of the fact that, as described above, the circuit is formed in the motor driver in accordance with predetermined design specifications. In other words, modification of the motor-driver circuit is necessary to accommodate any variation in the motor characteristics which may occur.

Current portable mini-disk (MD) players employ as means for driving an MD a brush-less, three-phase motor (referred to simply as "motor", hereinafter) which does not have any hall element for detecting rotational positions. In operation, the speed of rotation of the motor rotor is computed based on the phase difference between counter-electromotive edge signals which are obtained as a result of operation of the motor, and the timing of switching of the phase is determined in accordance with the rotor speed.

The term "counter-electromotive edge" is used in this specification to mean an output from a comparator which compares an intermediate potential as a reference and a counter-electromotive force that is induced in the coil of each phase. This method of motor control will be referred to as "control under first delay mode", hereinafter.

It is to be pointed out that any inter-phase offset existing in the comparator for generating detection signals corresponding to rotational positions of the motor rotor tends to cause an undesirable effect, particularly when the rotation speed is low. In other words, error which is involved in the detection signal corresponding to the rotational position of the motor rotor is significant as compared with the case where no offset exists in the comparator. Such a detection signal involving an error may undesirably be masked by a mask signal, which is intended to avoid erroneous detection of the edge, thus hampering correct control of the motor.

A motor control method also has been known in which the motor is controlled by computing a rotation speed based on the time interval between counter-electromotive edges corresponding to one period of a single counter-electromotive edge, i.e., the time interval of counter-electromotive edge corresponding to ¼ rotation of the motor rotor. In the following description, this type of motor control method will be referred to as "control under second delay mode"

In the control under second delay mode, the rotation speed is computed based on the time interval between the counter-electromotive edges corresponding to ¼ rotation of the motor rotor. Therefore, when the motor is abruptly accelerated or decelerated, the counter-electromotive edge tends to be deformed, posing a risk that the phase switching cannot be performed at proper timing.

SUMMARY OF THE INVENTION

Accordingly, it is an object of the present invention to provide a disk drive apparatus which allows optimum motor control while reducing the circuit scale and cost and which has wider adaptability than known apparatuses.

To achieve the above-described object of the present invention, one aspect of the present invention provides a disk drive apparatus for driving by means of a motor a disk mounted thereon so as to reproduce signals recorded in the disk, comprising: edge-signal generating means for generating, in accordance with a plurality of voltages induced when the motor is driven, edge signals indicating a switch timing among phases of the voltages; and drive_voltage control means for controlling the maximum value of a drive voltage for driving the motor in accordance with the edge signals.

With these features, the drive-voltage control means easily and reliably reduces the drive-voltage at the timing of phase switching. The drive-voltage control means can be implemented by a limiter circuit which limits, in accordance with the edge signal, the drive voltage to a level which does not exceed a predetermined level.

The drive-voltage control means may be arranged to cause a transition of the maximum value between two different levels and may include transition pattern selecting means for setting, in accordance with a command supplied thereto, the time of transition of the maximum value between the two levels to a constant value or to a variable value. Such an arrangement implements a control method that is called soft-switching control, with a high degree of versatility.

The arrangement may be such that the drive-voltage control means includes a transition period computing means for computing the transition period of the maximum value based on an interval between the edge signals and also includes timing control means for controlling, in accordance with the edge signals, at least the timing of the start of transition of the maximum value or the timing of an end of transition of the maximum value, wherein the drive-voltage control means controls the maximum value based on the timing of the start or the end of the transition and the transition period.

This arrangement makes it possible to implement a soft-switching control with a simple structure.

The drive voltage control means may also include selecting means for selecting, in accordance with a command supplied thereto, a mode where the maximum value is subjected to soft-switching control or another mode where the maximum value is kept constant. Such selecting means further enhances the versatility of the motor-control method.

To achieve the above-described object of the present invention, another aspect of the present invention provides a disk drive apparatus having driving means for driving a disk mounted thereon, by controlling a motor in accordance with a signal indicating the timing of phase switching, comprising: first timing-signal generating means for generating, based on a phase difference among a plurality of drive signals for driving the motor, a first timing signal which determines a timing of phase switching of the motor; second timing-signal generating means for generating, based on the period of any one of the drive signals, a second timing signal which determines a timing of phase switching of the motor; and motor control means for selectively supplying the first timing signal or the second timing signal to the driving means in accordance with the speed of rotation of the rotor of the motor.

With these features, the motor is driven in accordance with the first timing signal or the second timing signal, depending on the speed of rotation of the motor rotor.

The arrangement may be such that the second timing-signal generating means includes period-measuring means for selectively measuring N or M periods of any one of the drive signals in accordance with a selection signal supplied thereto, where N and M are natural numbers different from each other, and the timing of phase switching is set in every N periods or M periods measured by the period measuring means. This arrangement permits easy control of the timing of phase switching. Thus, the rotation speed of the motor rotor can be changed easily by driving the motor in accordance with the second timing signal.

The disk drive apparatus of the second aspect may further comprise a speed-computing means which computes the rotation speed of the rotor of the motor in accordance with the drive signals and which generates a selection signal corresponding to the computed rotation speed, wherein the motor-control means selectively supplies the first timing signal or the second timing signal to the driving means in accordance with the selection signal generated by the speed-computing means. With this arrangement, the speed-computing means performs quick computation of the motor speed, enabling the motor-control means to perform quick control of the motor in accordance with the rotation speed of the motor rotor.

The motor-control means also may be arranged to selectively supply the first timing signal or the second timing signal to the driving means in accordance with an externally-supplied control signal.

BRIEF DESCRIPTION OF THE DRAWINGS

FIG. 20 is a timing chart showing the operation of the second delay circuit shown in FIG. 17; and FIG. 21 is a timing chart showing the operation of the disk drive apparatus of FIG. 1.

DESCRIPTION OF THE PREFERRED EMBODIMENTS

Figure 1:
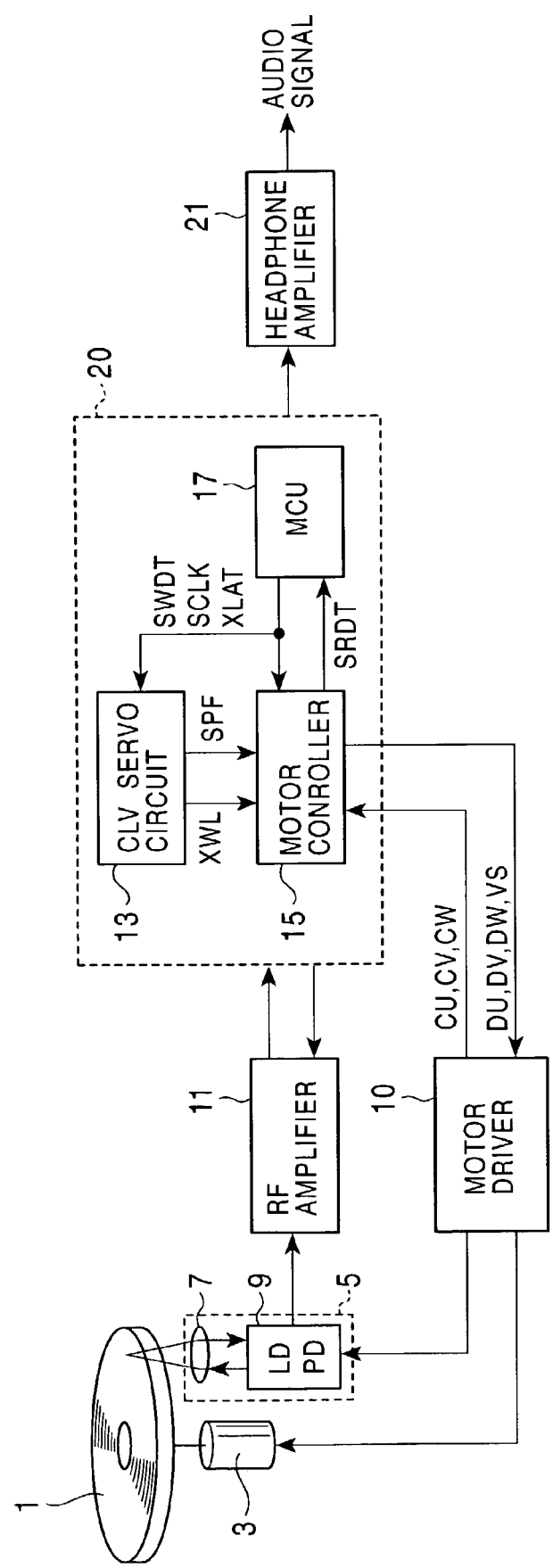
FIG. 1 is a block diagram showing an overall structure of a disk drive apparatus in accordance with the present invention.

Embodiments of the present invention will now be described with reference to the accompanying drawings. Throughout the drawings, the same or like reference numerals are used to denote the same or equivalent parts or members.

Referring to FIG. 1, which is a block diagram showing the overall configuration of the disk drive apparatus embodying the present invention, the disk drive apparatus has a spindle motor 3 for rotationally driving a disk 1, a reading unit 5 for reading signals recorded in the disk 1 a motor driver 10, a RF amplifier 11, a system LSI 20, and a headphone amplifier 21. The reading unit 5 includes a pickup 7 and an element section 9 which comprises a laser diode (LD) and a photo-detect IC (PD). The system LSI 20 includes a CLV servo circuit 13, a motor controller 15, and an MCU 17. The spindle motor 3 is a brushless, three-phase motor (referred to also as "motor", hereinafter) which does not have a hall element for detecting the rotational position of the motor rotor. The motor will be described later in detail.

The spindle motor 3 and the reading unit 5 are connected to the motor driver 10, while the RF amplifier 11 is connected to the element section 9. The system LSI 20 is connected to the motor driver 10 and the RF amplifier 11, while the headphone amplifier 21 is connected to the system LSI 20.

The motor controller 15 is connected to the motor driver 10, and the CLV servo circuit 13 is connected both to the motor controller 15 and the MCU 17. The MCU 17 is connected to the motor controller 15.

In the disk drive apparatus of the illustrated embodiment, a signal detected by a photo-detect IC of the element section 9 is amplified by the RF amplifier 11, and the amplified signal is subjected to a predetermined processing performed by the system LSI 20. The processed signal is amplified by the headphone amplifier 21 and is output as an audio signal.

The CLV servo circuit 13 performs a pulse-width modulation in accordance with signals SWDT, SCLK and XLAT that are supplied from the MCU 17, thereby generating a signal SPF, and delivers this signal to the motor controller 15. The CLV servo circuit also produces a signal XWL and delivers this signal to the motor controller 15.

The motor controller 15 is controlled in accordance with signals SWDT, SCLK and XLAT that are supplied from the MCU 17, and generates, based on the signal SPF supplied from the CLV circuit 13, a drive voltage VS for driving the spindle motor 3. The motor controller 15 supplies this drive voltage VS to the motor driver 10. The motor controller 15 generates logical drive signals DU, DV and DW for controlling the spindle motor 3 and supplies these logical drive signals to the motor driver 10.

In accordance with the logical drive signals DU, DV and DW and the drive voltage VS, the motor driver 10 generates signals CU, CV and CW, which indicate the rotational position of the motor rotor, and delivers these signals to the motor controller 15.

Figure 2:
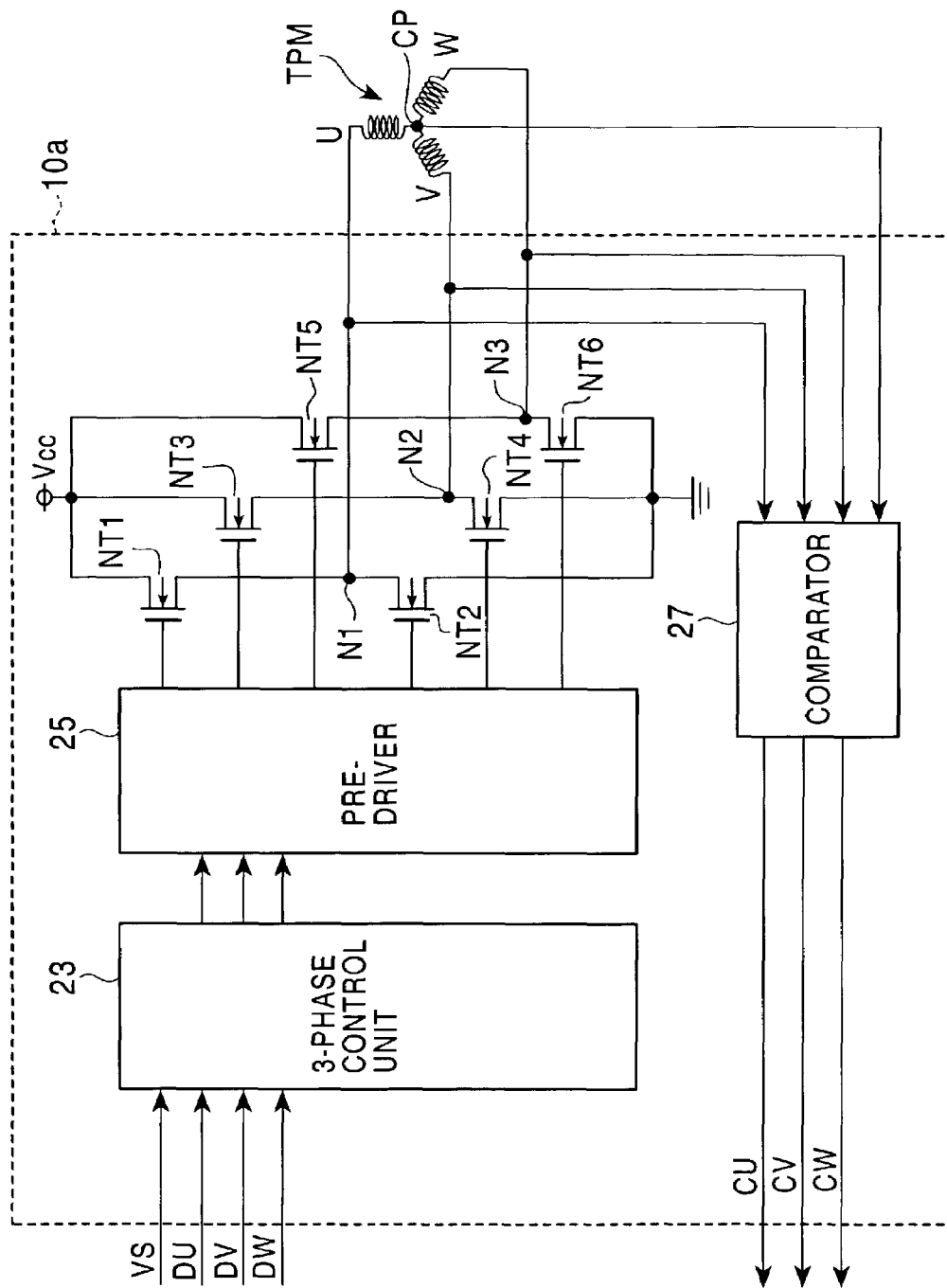
FIG. 2 is a diagram showing the configuration of a drive unit of a motor driver included in the disk drive apparatus of FIG. 1.

FIG. 2 is a diagram showing the configuration of a drive unit 10a included in the motor driver 10 of the apparatus shown in FIG. 1. As will be seen from FIG. 2, the drive unit 10a has a three-phase control unit 23, a pre-driver 25, a comparator 27, N-channel MOS transistors NT1 to NT6, and intermediate nodes N1 to N3. The three-phase control unit 23 is connected to the motor controller 15, while the pre-driver 25 is connected to the three-phase control unit 23.

A series connection of the N-channel MOS transistors NT1 and NT2, a series connection of the N-cannel MOS transistors NT3 and NT4, and a series connection of the N-channel MOS transistors NT5 and NT6 are connected in parallel fashion between the source voltage node Vcc and the grounded node. The gates of the N-channel MOS transistors NT1 to NT6 are connected to the pre-driver 25.

The intermediate node N1 between the N-channel MOS transistors NT1 and NT2, the intermediate node N2 between the N-channel MOS transistors NT3 and NT4, and the intermediate node N3 between the N-channel MOS transistors NT5 and NT6 are connected to the motor TPM and to the comparator 27. The neutral point CP of the motor TPM is connected to the comparator 27. The motor TPM is incorporated in the spindle motor 3 shown in FIG. 1.

In the drive unit 10a having the described structure, the three-phase control unit 23 determines the directions of the electrical currents for driving the motor TPM in accordance with the logical drive signals DU, DV and DW received from the motor controller 15 and the drive voltage VS. The drive unit 10a then delivers to the pre-driver 25 signals which indicate the directions of the electrical currents. The pre-driver 25 decodes these direction signals and selectively delivers voltages exceeding a threshold voltage to the gates of the N-channel MOS transistors NT1 to NT6. As a result, the N-channel MOS transistors NT1 to NT6 are selectively turned on, so that the potentials of the intermediate nodes N1 to N3 are adjusted, whereby electrical currents of predetermined directions are supplied to the motor TPM.

The comparator 27 compares the voltages of the three phases, i.e., the potentials at the intermediate nodes N1 to N3, with the potential of the neutral point CP and generates signals CU, CV and CW indicative of the rotational position of the motor rotor. The comparator 27 then delivers these signals to the motor controller 15.

Figure 3:
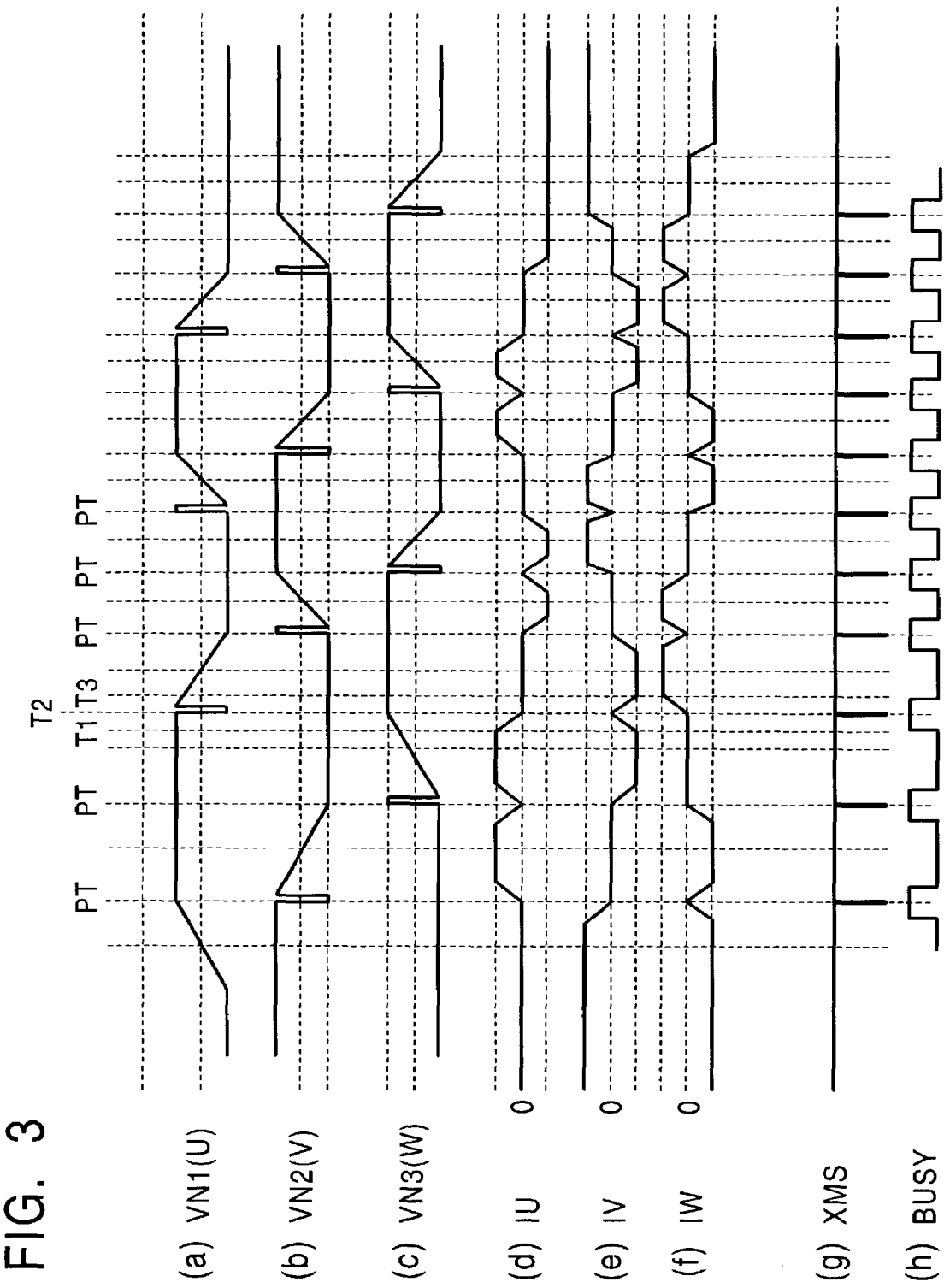
FIG. 3 is a first timing chart showing a method for controlling the motor shown in FIG. 2.

A description will now be given of a method for controlling the motor TPM shown in FIG. 2, with specific reference to FIGS. 3 and 4. Sections (a) to (c) in FIG. 3 show the potentials VN1 to VN3 of the intermediate anodes N1 to N3 shown in FIG. 2, while sections (d) to (f) indicates the magnitudes IU, IV and IW of the electrical currents which flow into the neutral point CP via the intermediate nodes N1 to N3. A mask set signal XMS shown in Section (g) and a signal BUSY shown in section (h) of FIG. 3 will be described later.

Figure 4:
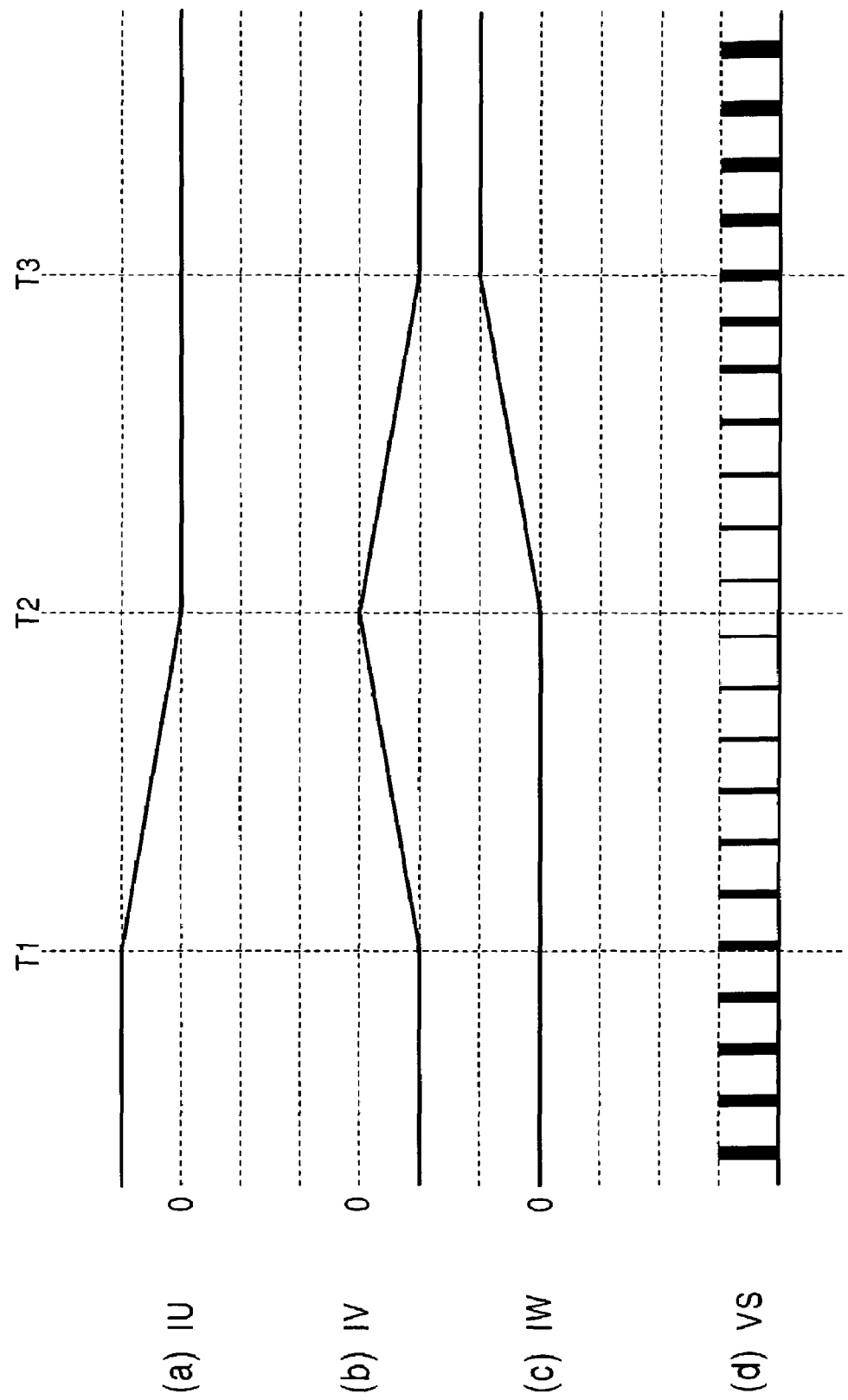
FIG. 4 is a second timing chart showing a method for controlling the motor shown in FIG. 2.

FIG. 4 shows, in a greater scale, variations in the electrical currents IU to IW and the drive voltage VS at a period between moments T1 and T3. Referring to FIGS. 3 and 4, phase switching is performed at moments PT and T2, and spike voltages are generated at such moments of phase switching as shown in sections (a) to (c) of FIG. 3.

In the meantime, the motor controller 15 maintains the phase of high impedance (Hi-Z) until the phase switching is performed in the motor TPM, as will be seen from FIGS. 3 and 4. Therefore, in the period between the moments T1 and T2, for example, the current IW is maintained at zero. Meanwhile, as shown in section (d) of FIG. 3 and section (a) of FIG. 4, the electrical current IU coming into the neutral point CP from the intermediate node N1 starts to decrease from the moment T1, which is the moment of start of soft switching, and is reduced to zero or a value near zero at the moment T2, which is the timing of the phase switching. After the phase switching is performed at the moment T2, the electrical current from the neutral point PC to the intermediate node N3 is gradually increased towards the moment T3, which is the timing of finish of the phase switching operation, as will be seen from section (f) of FIG. 3 and section (c) of FIG. 4.

In section (d) of FIG. 4, the drive voltage VS is shown in terms of pulse width modulation, from which it will be seen that the driving voltage VS is gradually decreased from the moment T1 to the moment T2 and then gradually increased from the moment T2 to the moment T3. A detailed description will now be given of the motor controller 15.

Figure 5:
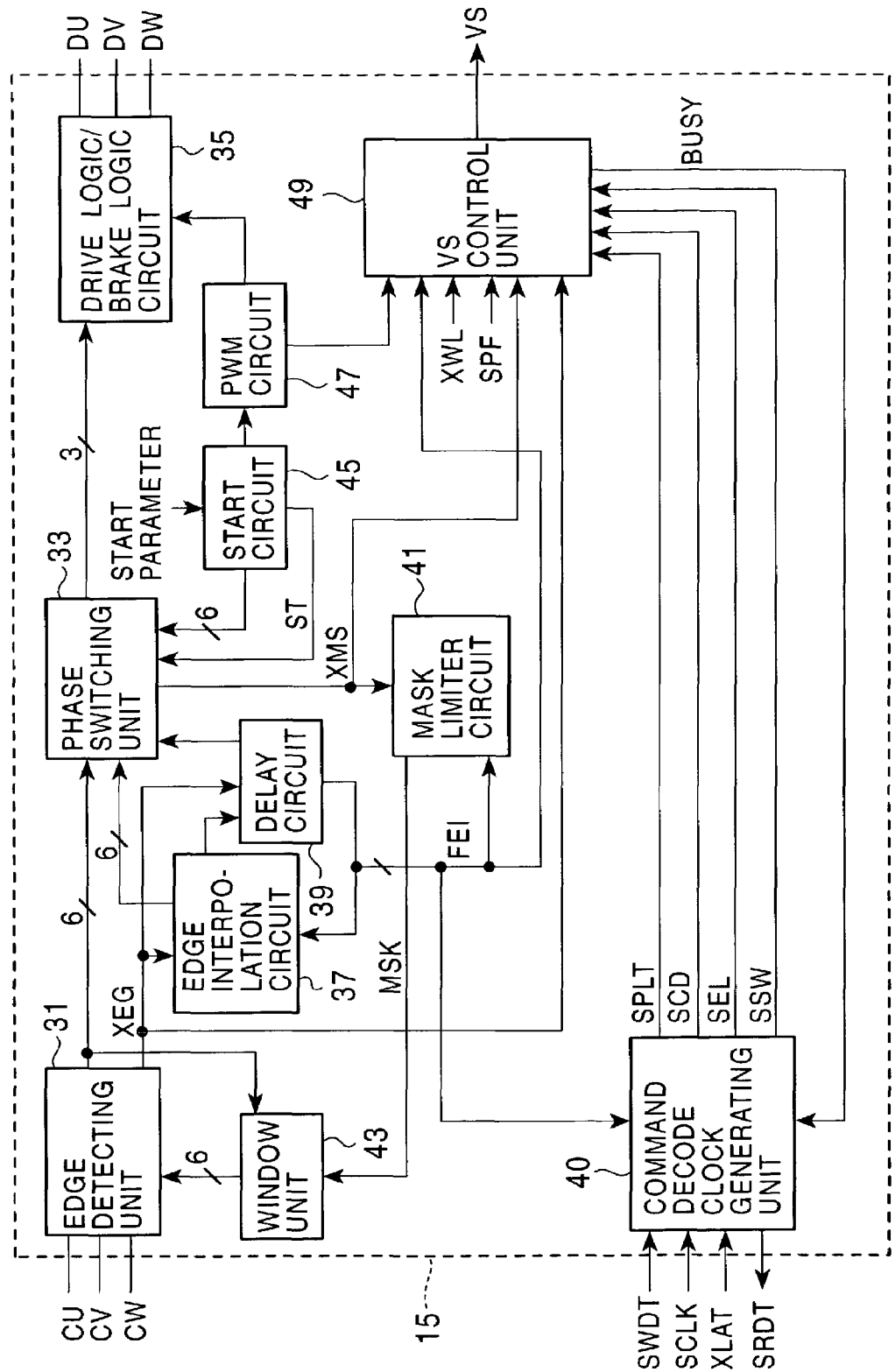
FIG. 5 is a timing chart showing the operation of a motor controller incorporated in the disk-control apparatus shown in FIG. 1.

FIG. 5 is a diagram showing the configuration of the motor controller 15 shown in FIG. 1. As will be seen from this Figure, the motor controller 15 includes a edge detecting unit 31, a phase switching unit 33, a drive logic/brake logic circuit 35, an inside edge circuit 37, a delay circuit 39, a command decode clock generating unit 40, a mask limiter circuit 41, a window unit 43, a start circuit 45, an PWM circuit 47, and a VS control unit 49.

The edge detecting unit 31 is connected to the motor driver 10. The phase switching unit 33 is connected to the edge detecting unit 31. The drive logic/brake logic circuit 35 is connected to the phase switching unit 33. The inside edge circuit 37 is connected to the edge detecting unit 31. The delay circuit 39 is connected to the edge detecting unit 31 and the inside edge circuit 37.

The command decode clock generating unit 40 is connected to the CLV servo circuit 13, the delay circuit 39 and the VS control unit 49. The mask limiter circuit 41 is connected to the phase switching unit 33 and the delay circuit 39. The window unit 43 is connected to the mask limiter circuit 41. The start circuit 45 is supplied with a start parameter, which is required for starting the spindle motor 3.

The PWM circuit 47 is connected to the start circuit 45. The VS control unit 49 is connected to the edge detecting unit 31, the phase switching unit 33, the delay circuit 39, the PWM circuit 47 and the command data clock generating unit 40.

A description will now be given of the operation of the motor controller 15 having the described structure, with specific reference to FIG. 6. In sections (a) and (b), the drive voltage VS is shown in analog form.

The edge detecting unit 31 detects the timings at which the logical levels of signals CU, CV and CW shown in sections (c) to (e) are changed, i.e., edges of these signals, and generates an edge-detection signal XEG upon detection of each edge. The delay circuit 39 computes, based on the edge-detection signal XEG generated by the edge detecting unit 31, an amount of delay which is necessary for computing the timing of phase switching, and generates an edge-interval signal FEI which indicates the speed of rotation of the rotor of the spindle motor 3. A detailed description will be given later in this connection.

The motor may become out of phase in the event that the edge detecting unit 31 fails to correctly detect the edge. In order to ensure safe rotation of the rotor of the spindle motor 3, despite any omission of an edge, the edge interpolation circuit 37 supplies, based on the edge-detection signal XEG received from the edge-detecting circuit and the edge-interval signal FEI received from the delay circuit 39, an edge detection signal to the phase switching unit 33 and the delay circuit 39, thereby effecting interpolation of the edge detection signal.

Figure 6:
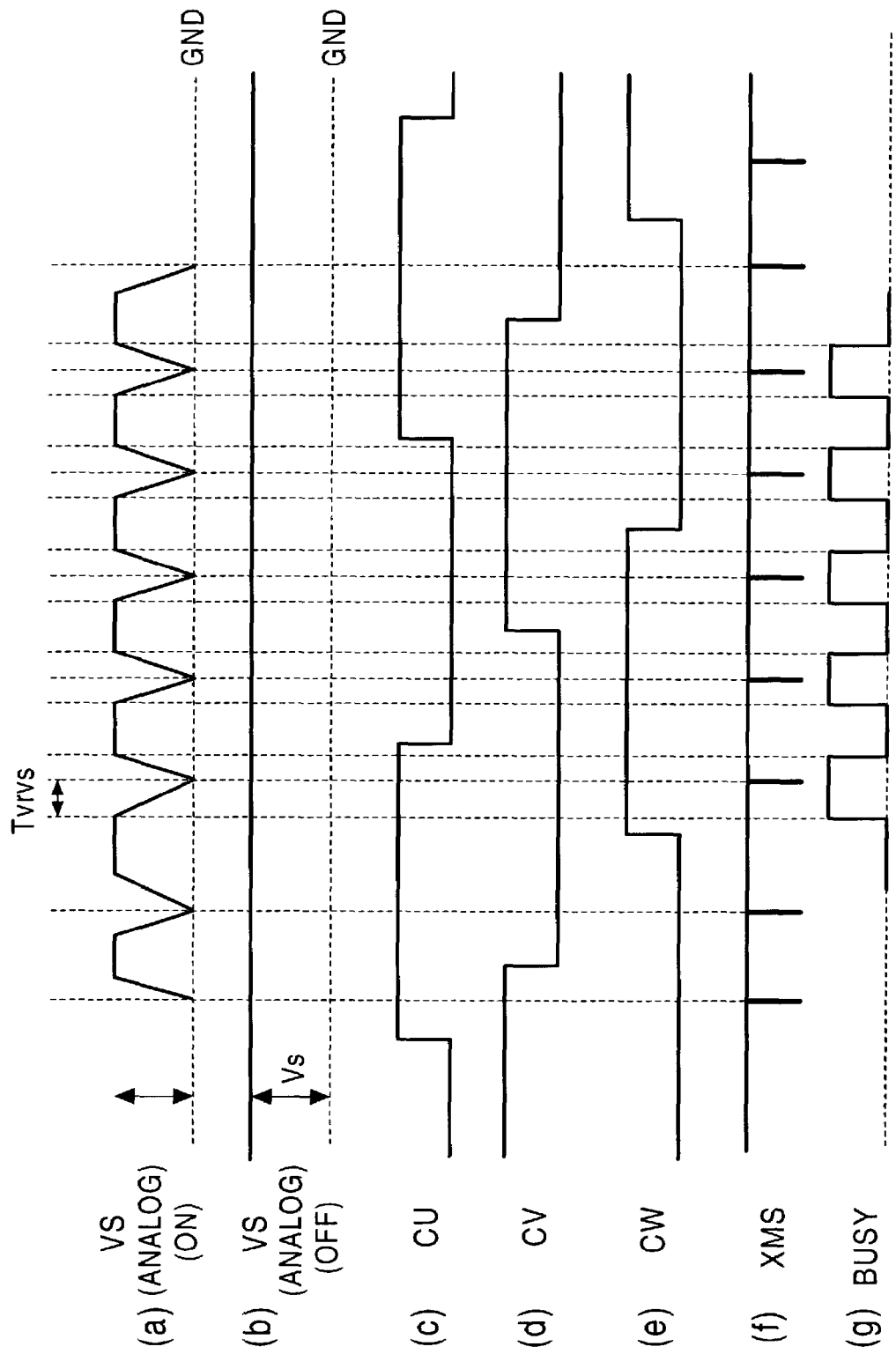
FIG. 6 is a timing chart showing the operation of the motor controller shown in FIG. 5.

The phase switching unit 33 generates, based on the signals received from the edge detecting init 31 and the edge interpolation circuit 37 and on the amount of delay determined by the delay circuit, a mask-set signal XMS which indicates the timing of phase switching of the motor TPM, as shown in section (f) of FIG. 6. The phase switching unit 33 delivers this mask-set signal XMS to the mask limiter circuit 41 and to the VS control unit 49. The phase switching unit 33 also delivers to the drive logic/brake logic circuit 35 a control signal for controlling the rotation of the rotor of the spindle motor 3.

Upon receipt of the start parameter, the start circuit 45 generates a start signal ST and a phase-switching signal in accordance with the start parameter. The start circuit 45 delivers the start signal ST to the phase switching unit 33 while delivering the phase-switching signal to the phase switching unit 33 and to the PWM circuit 47. The PWM circuit 47 generates a pulse-width-modulation (PWM) signal by effecting pulse width modulation on the signal supplied from the start circuit 45. The drive logic/brake logic circuit 35 serves to accelerate or decelerate the spindle motor 3 by generating logical drive signals DU, DV, DW in accordance with the control signals supplied from the phase switching unit 33.

The mask limiter circuit 41 determines a masking time in accordance with the edge-interval signal FEI received from the delay circuit 39 and the mask-set signal XMS received from the phase switching unit 33. The mask limiter circuit 41 also serves to limit the rotation speed of the rotor of the spindle motor 3 so that the speed falls within a predetermined range. The mask limiter circuit 41 generates a mask signal MSK and delivers this signal to the window unit 43.

Upon receipt of the edge-detection signal and the mask signal MSK, the window unit 43 generates a window signal based on these signals and delivers the window signal to the edge detecting unit 31. The window signal is a pulse signal which determines the state as to whether detection of an edge is enabled. For instance, the edge detecting unit 31 produces an edge-detection signal only when the window signal is held at a high level.

The command decode clock generating unit 40 produces a serial signal SRDT based on the edge-interval signal FEI received from the delay circuit and a signal BUSY received from the VS control unit 49, which will be described later. The command decode clock generating unit 40 delivers the serial signal SRDT to the MCU 17. The MCU 17 supplies commands SWDT, SCLK and XLAT to the command decode clock generating unit 40, while monitoring the serial signal SRDT by running software. The command decode clock generating circuit 40 decodes the commands SWDT, SCLK and XLAT received from the MCU 17, thereby generating a maximum-control signal SPLT, a selection signal SEL, a command signal SCD, and a control switching signal SSW.

The VS control unit 49 generates a drive voltage VS based on the following signals: the pulse-width-modulation-signal received from the PWM circuit 47; the edge-interval signal FEI received from the delay circuit 39; the signal SPF and XWL received from the CLV servo circuit 13; the mask-set signal XMS received from the phase switching unit 33; the edge-detection signal XEG received from the edge detecting unit 31; and the maximum-control signal SPLT, the selection signal SEL and the command signal SCD received from the command decode clock generating unit 40. The VS control unit 49 delivers this drive voltage VS to the motor driver 10.

In accordance with the control switching signal SSW received from the command decode clock generating unit 40, the VS control unit 49 also serves to turn on and off a function that is called "soft-switching control", which lowers the maximum value of the drive voltage at the time of phase switching. When a command for turning off the soft-switching control is supplied from the MCU 17 to the motor controller 15, the VS control unit 49 delivers a constant drive voltage VS, as shown in section (b) of FIG. 6.

The VS control unit 49 implements the soft-switching control, as shown in section (a) of FIG. 6, by means of a digital circuit, as will be described in detail hereinunder.

Figure 7:
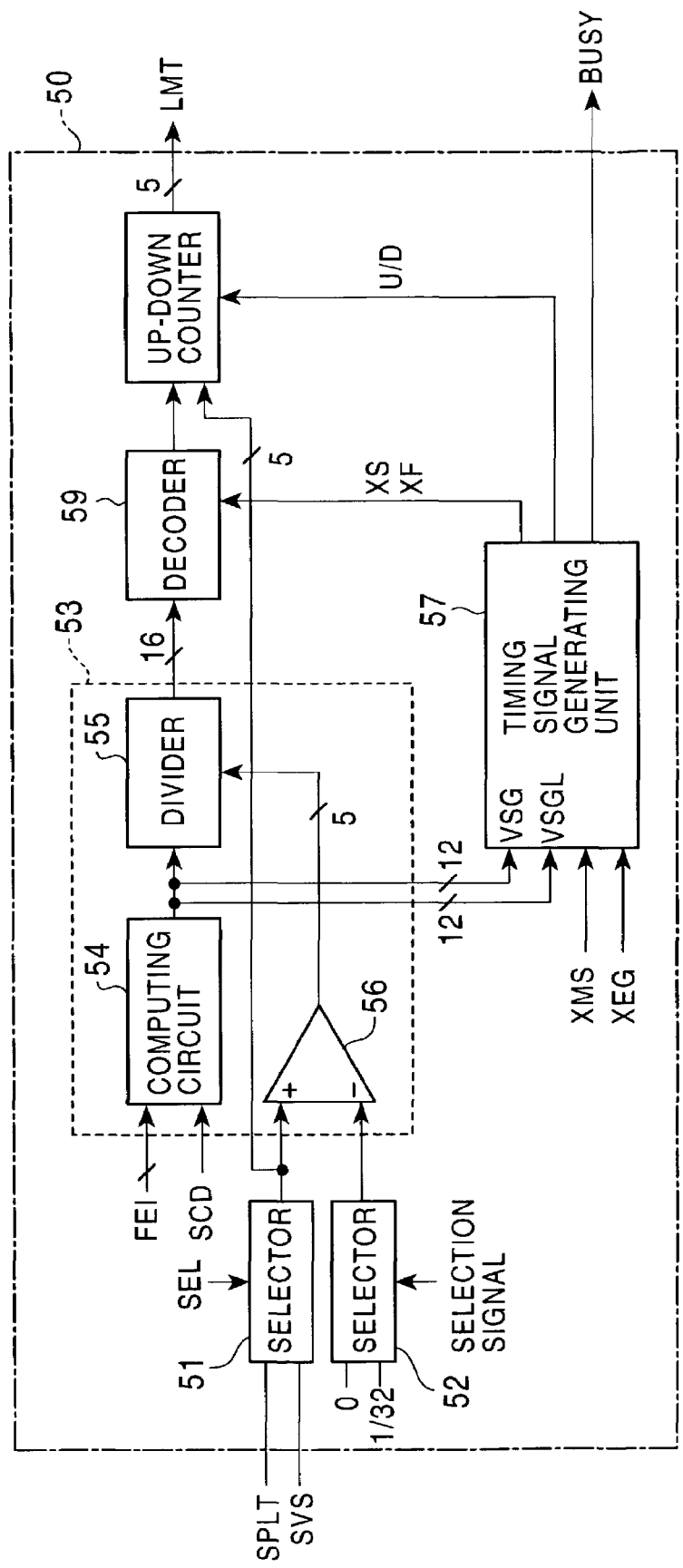
FIG. 7 is a block diagram showing the configuration of a maximum-limiter-value-determining circuit included in the VS control unit of the motor controller shown in FIG. 5.
Figure 9:
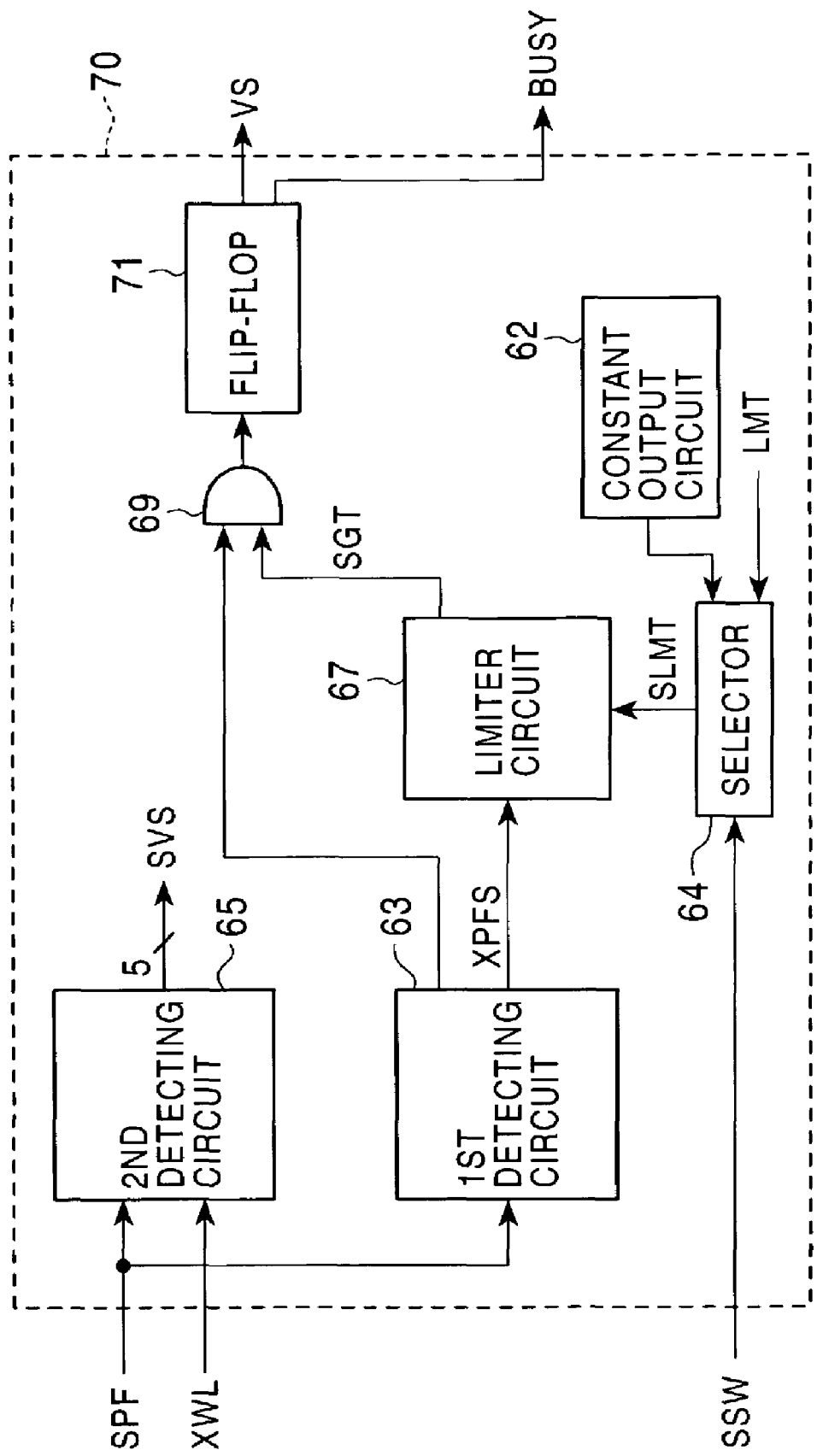
FIG. 9 is a block diagram showing the configuration of a maximum-value-limiting-circuit included in the VS-control unit of the motor controller shown in FIG. 5.

The VS control unit 49 shown in FIG. 5 includes a maximum limiter value determining circuit 50, which is shown in FIG. 7, and a maximum value limiting circuit 70 which is shown in FIG. 9.

As shown in FIG. 7, the maximum limiter value determining circuit 50 includes selectors 51 and 52, a computing unit 53, a timing signal generating unit 57, a decoder 59, and an up-down counter 61. The computing unit 53 includes a computing circuit 54, a divider 55, and a comparator 56.

The selector 51 receives a signal SPLT generated by the command decode clock generating unit 40 and a signal SVS generated by a second detecting circuit 65, which will be described later. The selector 52 is supplied with numerical information, which is 0 or $\frac{1}{32}$, and which is a target value of the duty ratio of the drive voltage VS. Meanwhile, the computing circuit 54 is supplied with the edge-interval signal FEI and the command signal SCD.

The comparator 56 has a plus terminal that is connected to the selector 51 and a minus terminal that is connected to the selector 52. The divider 55 is connected to the output terminal of the computing circuit 54 and also to the output terminal of the comparator 56. The timing signal generating unit 57 is connected to the edge detecting unit 31, the phase switching unit 33 and also to the computing circuit 54. The decoder 59 is connected to the divider 55 and the timing signal generating circuit 57. The up-down counter 61 is connected to the decoder 59, the selector 51 and the timing signal generating unit 57.

The maximum limiter value determining circuit 50 having the described structure controls the pulse-width modulation in accordance with the phase-switching timing of the spindle motor 3. More specifically, in the period across the phase switching, the duty ratio in the pulse-width modulation is set to zero (this type of control will be referred to also as "PWM trapezoidal control"), thereby suppressing the electrical current flowing into the spindle motor 3 at the time of phase switching, and thus reducing the magnitude of variation of the electrical current caused by the phase switching. Consequently, attracting and repulsion forces acting between the rotor and the stator of the spindle motor 3 are suppressed, whereby noise is reduced. More specifically, the maximum limiter value determining circuit 50 generates a limiter signal LMT for controlling the maximum value limiting circuit 70, in a manner that will be described below.

In accordance with the selection signal SEL generated by the command decode clock generating unit 40, the selector 51 selectively delivers one of the signal SPLT and the signal SVS to the plus terminal of the comparator 56 and also to the up-down counter 61, which will be described later. The selector 52 selectively delivers numerical value information of 0 or 1/32 to the minus terminal of the comparator 56 in accordance with the duty ratio of the generated drive voltage VS.

The computing unit 53 computes a parameter which is necessary for the PWM trapezoidal control. More specifically, the comparator 56 compares the duty ratio CVS of the present drive voltage received from the selector 51 with the duty ratio of the target drive voltage VS and delivers to the divider 55 a signal corresponding to the result of the comparison. In the meantime, the computing circuit generates, based on the edge-interval signal FEI and the command signal SCD, and signal VSG indicative of the transition time Tvrvs of the drive voltage VS shown in section (a) of FIG. 6 and also generates a signal VSGL indicative of the difference between 1/2 of the edge-interval signal FEI and the signal VSG. The computing circuit 54 delivers these signals to the divider 55 and the timing generating unit 57.

The divider 55 divides the signal VSG received from the computing circuit 54 by the signal supplied from the comparator 56 and supplies the resultant quotient and residue to the decoder 59. The timing signal generating unit 57 generates, based on the signals VSG and VSGL supplied thereto, a signal XS indicative of the timing at which the duty ratio of the drive voltage (pulse-width modulation signal) starts to vary and a signal XF indicative of the timing at which the variation of the duty ratio terminates. The timing signal generating unit 57 delivers these signals to the decoder 59. These signals XS and XF are generated by counters which measure the length of time from the moment of detection of an edge until the start of decrease of the drive voltage VS and the length of time over which the drive voltage VS increases. The timing signal generating unit 57 also generates the aforementioned signal BUSY, which indicates that the logical level of the drive voltage VS is being changed, and supplies this signal BUSY to the command decode clock generator 40 while delivering to the up-down counter a signal for controlling the maximum value of the drive voltage VS.

The decoder 59 decodes the signal XS supplied thereto and the signal representing the quotient received from the divider 55, thereby generating a count signal indicating the timing at which the maximum value of the drive voltage VS, and delivers the count signal to the up-down counter 61. The up-down counter 61 generates and outputs a control signal LMT which controls the maximum value limiting circuit 70, in accordance with the above-mentioned count signal, duty ratio CVS and the signal U/D. The maximum limiter value of the drive voltage is determined by this control signal LMT.

Figure 8:
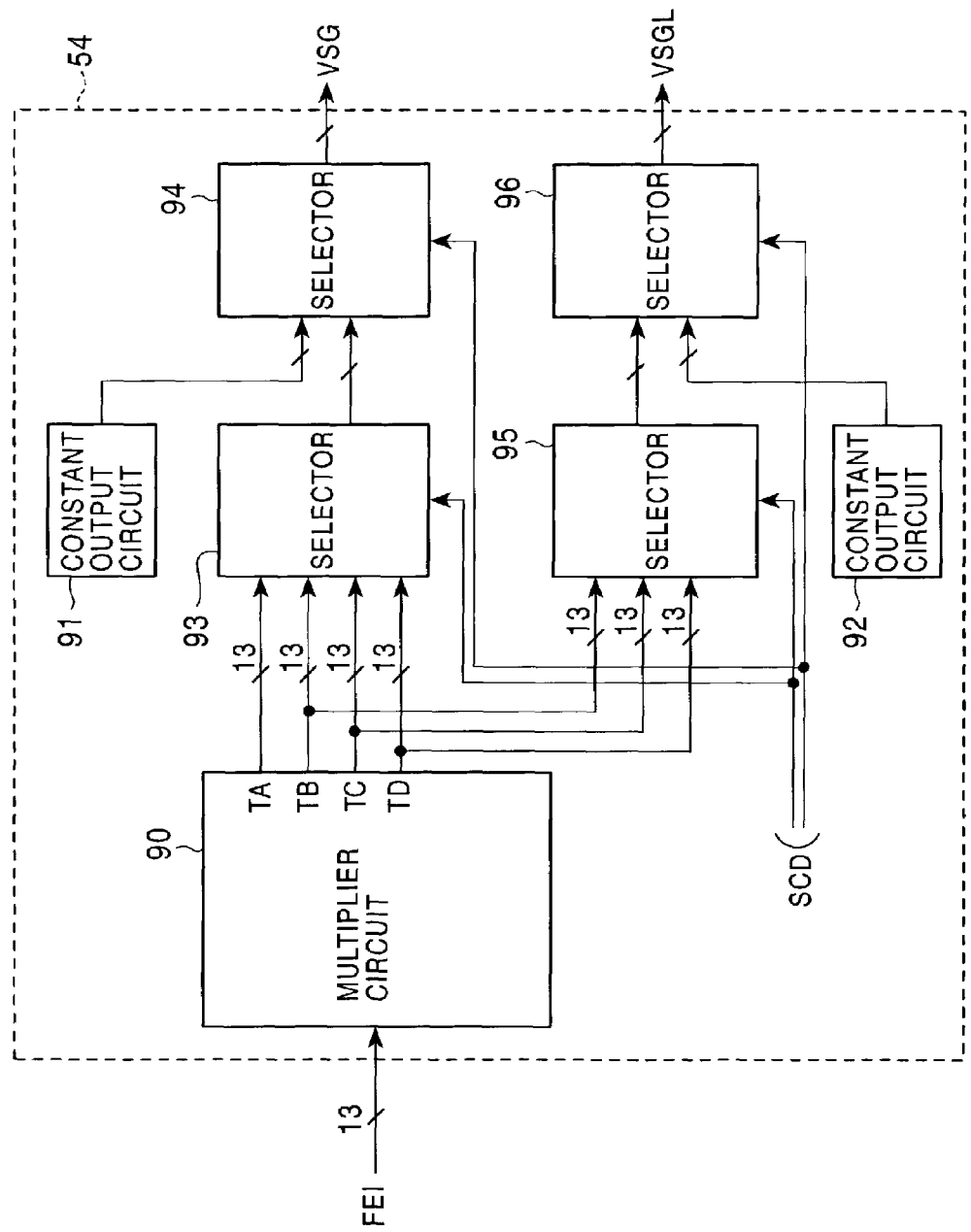
FIG. 8 is a block diagram showing the configuration of a computing circuit incorporated in the circuit shown in FIG. 7.

FIG. 8 is a block diagram showing the configuration of the computing circuit shown in FIG. 7. As will be seen from FIG. 8, the computing circuit 54 includes a multiplier circuit 90, constant output circuits 91 and 92, and selectors 93 to 96.

The multiplier circuit 90 is connected to the delay circuit 39, and the selectors 93 and 95 are connected to the multiplier circuit 90 and the command decode clock generating unit 40. The selector 94 is connected to the selector 93 and the command decode clock generating unit 40. Likewise, the selector 96 is connected to the selector 95 and the command decode clock generating unit 40. The constant output circuit 91 is connected to the selector 94, while the constant output circuit 92 is connected to the selector 96.

The multiplier circuit 90 has an output terminal TA which outputs a signal obtained by multiplying the received edge-interval signal FEI by 1/2, an output terminal TB which outputs a signal obtained by multiplying the received edge-interval signal FEI by 1/4, an output terminal TC which outputs a signal obtained by multiplying the received edge-interval signal FEI by 1/8, and an output terminal TD which outputs a signal obtained by multiplying the received edge-interval signal FEI by 3/8. Meanwhile, the constant output circuits 91 and 92 deliver signals of predetermined voltages to the selectors 94 and 96, respectively. The selectors 93 to 96 selectively output received signals in accordance with command signals supplied thereto, so that the selector 94 outputs the signal VSG, while the selector 96 outputs the signal VSGL.

In this way, the selectors 93 to 96 serve to control the transition time Tvrvs shown in FIG. 6 by varying the magnitudes of the signals VSG and VSGL. The transition time Tvrvs is controlled in accordance with the speed of rotation of the disk 1, but it is maintained constant when the selectors 94 and 96 selectively output the signals supplied from the constant output circuits 91 and 92.

In accordance with the above-mentioned control signal LMT, the maximum value limiting circuit 70 shown in FIG. 9 limits the maximum value of the signal SPF that is supplied thereto from the CLV servo circuit in the PWM form.

The maximum value limiting circuit 70 includes a constant output circuit 62, a first detecting circuit 63, a selector 64, a second detecting circuit 65, a limiter circuit 67, an AND circuit 69, and a flip-flop 71. The first detecting circuit 63 and the second detecting circuit 65 are connected to the CLV servo circuit 13, while the limiter circuit 67 is connected to the first detecting circuit 63. The constant output circuit 62 is connected to the selector 64, which in turn is connected to the command decode clock generating unit 40 and the limiter circuit 67. The AND circuit 69 is connected to the first detecting circuit 63 and the limiter circuit 67, while the flip-flop 71 is connected to the AND circuit 69.

In the maximum value limiting circuit 70 having the described configuration, the first detecting circuit 63 detects an edge (rise) of transition from a low level to a high level of the pulse-width modulation signal supplied thereto and delivers a low-level signal XPFS to the limiter circuit 67. Meanwhile, the second detecting circuit 65 detects the duty ratio of the above-mentioned signal SPF and, using the signal XWL from the CLV servo circuit 13 as a load signal for a counter, enables the counter to measure the duration over which the signal SPF is held at a high level. The second detecting circuit 65 then outputs the result of the measurement as the signal SVS.

In response to the control-switching signal SSW, the selector 64 delivers the control signal LMT generated by the maximum limiter value determining circuit 50 to the limiter circuit 67 as the control signal SLMT when the soft-switching control is to be turned on. When the soft-switching control is to be turned off, a constant signal of a fixed magnitude generated by the constant output circuit 62 is supplied as the control signal SLMT to the limiter circuit 67.

The limiter circuit 67 is a circuit for applying a limiter function for the duty ratio of the PWM signal. This circuit limits the maximum value of the drive voltage by means of a VS limiter counter incorporated therein. The VS limiter counter uses the received control signal SLMT as a load signal and continues to output a signal SGT of a high level until the count value reaches a predetermined set value. When this set value is reached, the VS limiter counter switches the signal SGT to a low level. The AND circuit 69 is inactivated when the signal SGT supplied thereto is at a low level. Therefore, the AND circuit 69 delivers the signal SPF to the flip-flop 71 only when the signal supplied to the first detecting circuit 63 does not exceed the set maximum value of the drive voltage.

In this way, the maximum value limiting circuit 70 delivers through its flip-flop 71 the drive voltage VS whose level does not exceed the above-mentioned maximum value.

Figure 10:
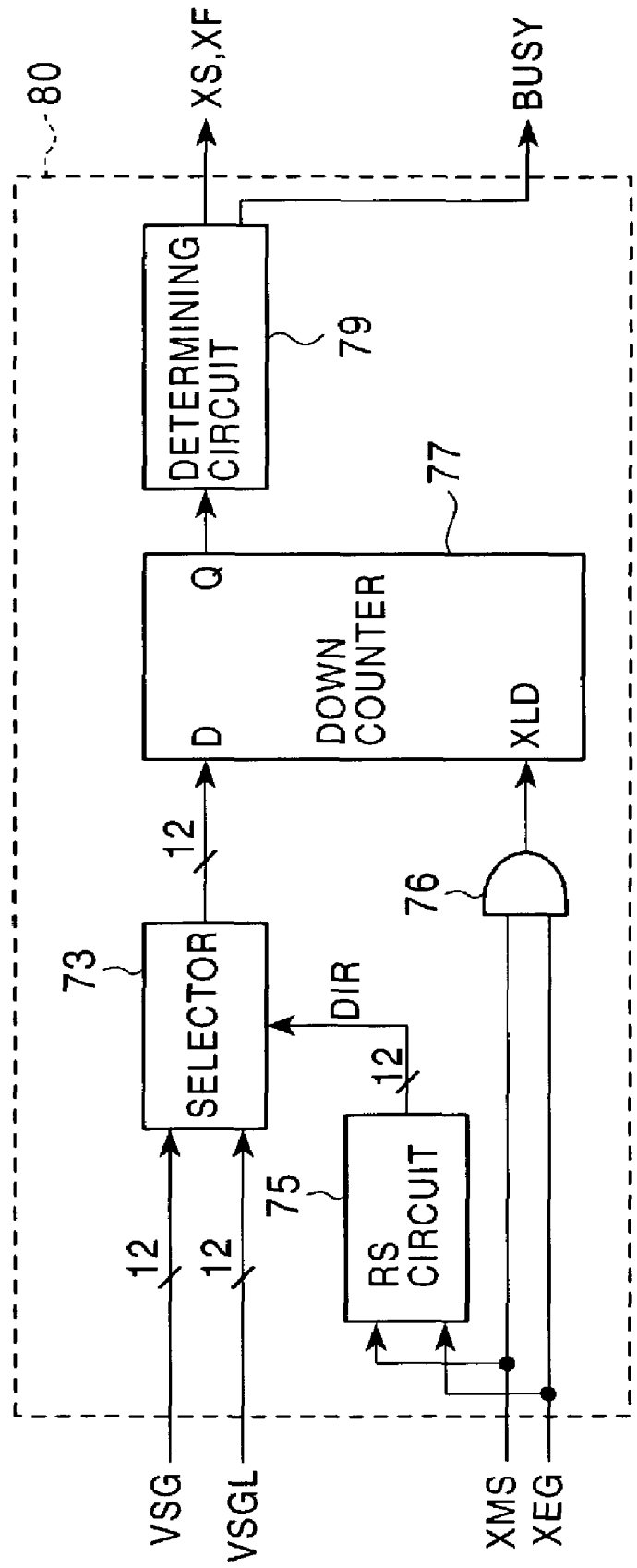
FIG. 10 is a block diagram showing the configuration of a signal-generating circuit included in the computing circuit shown in FIG. 7.

FIG. 10 shows the configuration of a signal generating circuit 80 that is included in the timing signal generating unit 57 shown in FIG. 7. As shown in FIG. 10, the signal generating circuit 80 includes a selector 73, an RS circuit 75, an AND circuit 76, a down counter 77 and a determining circuit 79. The RS circuit 75 is connected to the edge detecting unit 31 and the phase switching unit 33, while the selector 73 is connected to the computing circuit 54 and the RS circuit 75. The AND circuit 76 is connected to the edge detecting unit 31 and the phase switching unit 33.

The down counter 77 is connected to the selector 73 and the AND circuit 76, while the determining circuit 79 is connected to the counter 77.

In the signal generating circuit 80 having the described configuration, the RS circuit 75 generates a signal DIR which indicates an increase or a decrease of the drive voltage VS. The selector 73 selectively supplies the signal VSG or the signal VSGL to the down counter 77 in accordance with the above-mentioned signal DIR.

The counter 77 counts the time from the moment of detection of an edge until the moment at which the drive voltage starts to decrease, as well as the time over which the drive voltage increases. The determining circuit 79, which comprises a decoder, determines whether the count value of the down counter has reached a predetermined value.

The determining circuit 79 generates the signal XS and the signal XF, which respectively indicate the timings of the start and the end of the change in the duty ratio of the drive voltage, and outputs the signal BUSY shown in section (g) of FIG. 6 during the period over which the level of the drive voltage varies.

Figure 11:
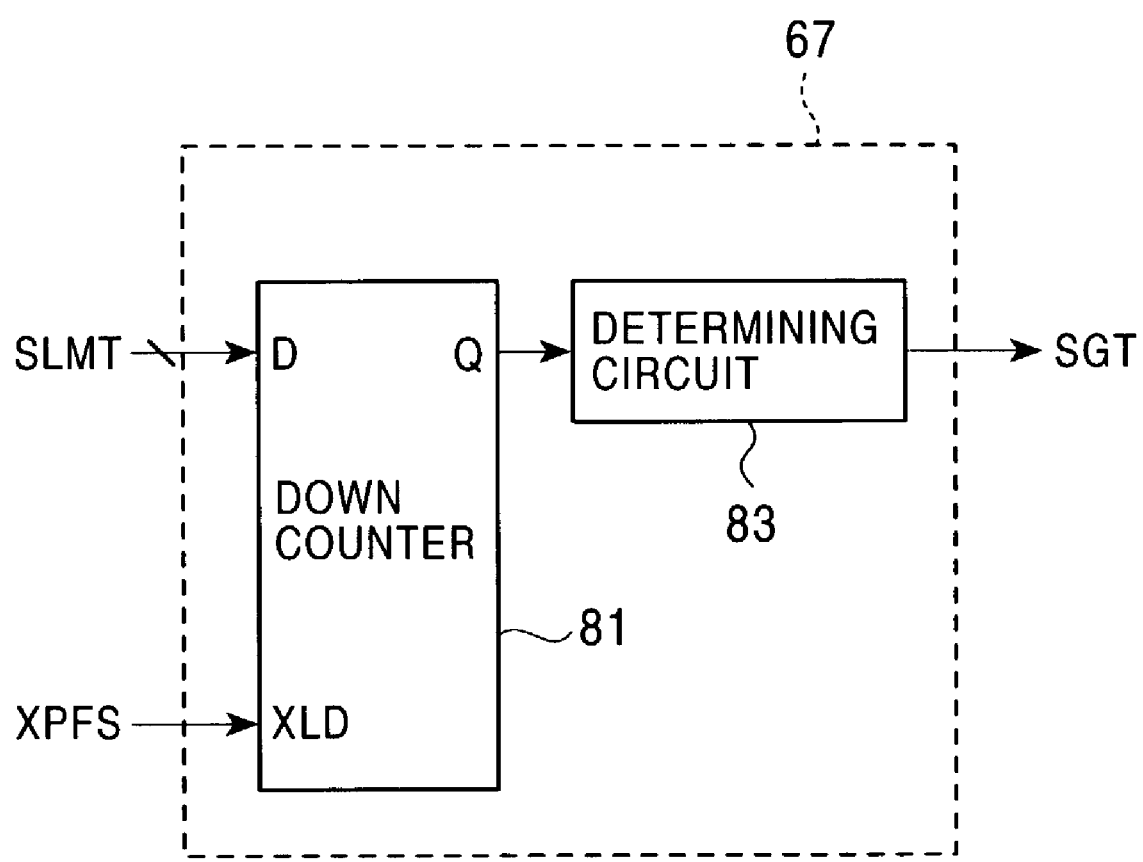
FIG. 11 is a block diagram showing the configuration of the limiter circuit in the circuit of FIG. 9.

FIG. 11 is a block diagram showing the configuration of the limiter circuit 67 shown in FIG. 9. As will be seen from FIG. 11, the limiter circuit 67 includes a down counter 81 connected to the selector 64 and the first detecting circuit 63 and a determining circuit 83 connected to the down counter 81. The determining circuit 83 determines whether the value counted by the down counter 81 has reached a predetermined value and, when this predetermined value is reached, produces the signal SGT of low level.

As will be understood from the foregoing description, the illustrated embodiment of the disk drive apparatus in accordance with the present invention employs the motor controller 15, which includes the maximum limiter value determining circuit 50 and the maximum value limiting circuit 70 and which controls the magnitude of the PWM signal SPF generated by the CLV servo circuit 13 shown in FIG. 1. With this feature, the illustrated embodiment implements a so-called soft switching by means of a digital circuit, thus facilitating enhancement of the scale of integration of the circuit.

The greater scale of circuit integration offered by the illustrated embodiment also contributes to a reduction in the cost of production of the disk drive apparatus.

The disk drive apparatus of the illustrated embodiment implemented by digital circuits permits easy control of the spindle motor 3 by means of software that runs on, for example, the MCU, thus offering a greater adaptability of the disk drive apparatus.

The VS control unit 49 included in the motor controller 15 turns on and off the software switching control in accordance with the command received from the MCU 17, making it easier to enhance the versatility in the control of the spindle motor 3.

Figure 12:
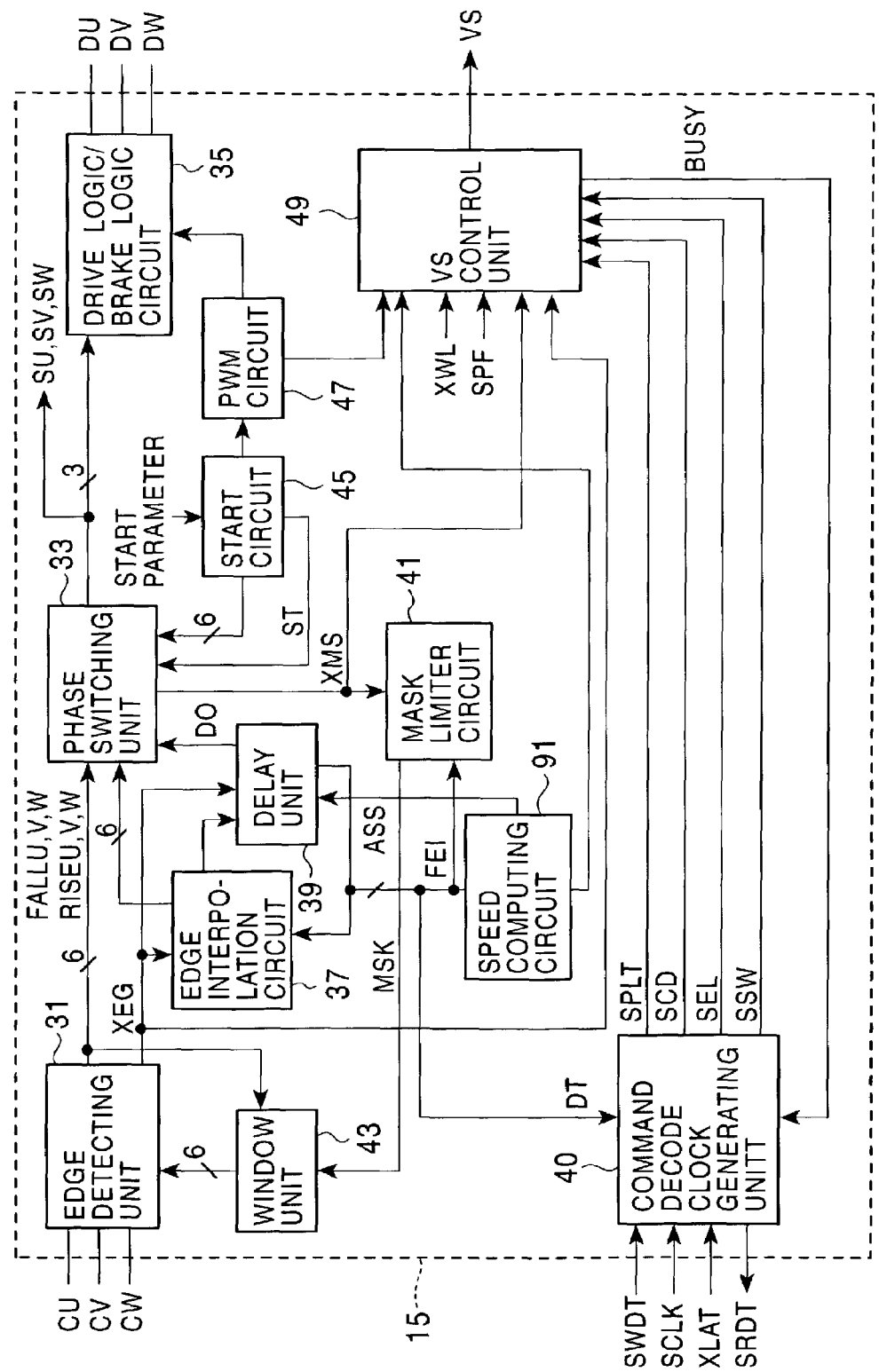
FIG. 12 is a block diagram showing the configuration of the motor controller in the disk drive apparatus of FIG. 1.

FIG. 12 is a block diagram showing another configuration of the motor controller 15 shown in FIG. 1. As will be seen from FIG. 12, the motor controller 15 includes an edge detecting unit 31, a phase change unit 33, a drive logic/brake logic circuit 35, an edge interpolation circuit 37, a delay unit 39, a command decode clock generating unit 40, a mask limiter circuit 41, a window unit 43, a start circuit 45, a PWM circuit 47, a VS control unit 49, and a speed computing circuit 91.

The edge detecting unit 31 is connected to the motor driver 10. The phase switching unit 33 is connected to the edge detecting unit 31. The drive logic/brake logic circuit 35 is connected to the phase switching unit 33. The edge interpolation circuit 37 is connected to the edge detecting unit 31. The delay unit 39 is connected to the edge detecting unit 31, the edge interpolation circuit 37 and the speed computing circuit 91.

The command decode clock generating unit 40 is connected to the CLV servo circuit 13, the delay unit 39 and the VS control unit 49. The mask limiter circuit 41 is connected to the phase switching unit 33 and the delay unit 39. The window unit 43 is connected to the mask limiter circuit 41. The start circuit 45 is supplied with a start parameter, which is necessary for starting the spindle motor 3, and the PWM circuit 47 is connected to the start circuit 45. The VS control unit 49 is connected to the edge detecting unit 31, the phase switching unit 33, the PWM circuit 47, the command decode clock generating unit 40, and the speed computing circuit 91. The speed computing circuit 91 is connected to the delay unit 39.

A description will now be given of the operation of the motor controller 15 having the described configuration. The edge detecting unit 31 detects the transitions (edges) of signals CU, CV and CW, which are shown in sections (a) to (c) of FIG. 14, sections (a) to (c) of FIG. 15, and sections (a) to (c) of FIG. 21. The edge detecting unit 31 then produces and outputs an edge-detection signal XEG by computing the NOR of edge-detection signals obtained as a result of detection of edges of the phases.

The delay circuit 39 computes, based on the edge-detection signal XEG generated by the edge detecting unit 31, an amount of delay which is necessary for computing the timing of phase switching, and generates an edge-interval signal FEI which indicates the speed of rotation of the rotor of the spindle motor 3.

The motor may become out of phase in the event that the edge detecting unit 31 fails to correctly detect the edge. In order to ensure safe rotation of the rotor of the spindle motor 3 despite any omission of an edge, the edge interpolation circuit 37 supplies, based on the edge-detection signal XEG received from the edge-detecting circuit and the edge-interval signal FEI received from the delay circuit 39, an edge-detection signal to the phase switching unit 33 and the delay circuit 39, thereby effecting interpolation of the edge detection signal.

The phase switching unit 33 generates, based on the signals received from the edge detecting init 31 and the edge interpolation circuit 37 and on the amount of delay determined by the delay circuit, a mask-set signal XMS which indicates the timing of phase switching of the motor TPM. The phase switching unit 33 delivers this mask-set signal XMS to the mask limiter circuit 41 and to the VS control unit 49. The phase switching unit 33 also delivers to the drive logic/brake logic circuit 35 a control signal for controlling the rotation of the rotor of the spindle motor 3.

Upon receipt of the start parameter, the start circuit 45 generates a start signal ST and a phase-switching signal in accordance with the start parameter. The start circuit 45 delivers the start signal ST to the phase-switching unit 33 while delivering the phase switching signal to the phase switching unit 33 and to the PWM circuit 47. The PWM circuit 47 generates a pulse-width modulation (PWM) signal by effecting pulse width modulation on the signal supplied from the start circuit 45. The drive logic/brake logic circuit 35 serves to accelerate or decelerate the spindle motor 3 by generating logical drive signals DU, DV, DW in accordance with the control signals supplied from the phase switching unit 33.

The mask limiter circuit 41 determines a masking time in accordance with the edge-interval signal FEI received from the delay circuit 39 and the mask-set signal XMS received from the phase switching unit 33. The mask limiter circuit 41 also serves to limit the rotation speed of the rotor of the spindle motor 3 so that the speed falls within a predetermined range. The mask limiter circuit 41 generates a mask signal MSK and delivers this signal to the window unit 43.

Upon receipt of the edge-detection signal and the mask signal MSK, the window unit 43 generates a window signal based on these signals and delivers the window signal to the edge detecting unit 31. The window signal is a pulse signal which determines the state as to whether detection of an edge is enabled. For instance, the edge detecting unit 31 produces an edge-detection signal only when the window signal is held at a high level.

The command decode clock generating unit 40 produces a serial signal SRDT based on the edge-interval signal FEI received from the delay circuit and a signal BUSY received from the VS control unit 49. The command decode clock generating unit 40 delivers the serial signal SRDT to the MCU 17. The MCU 17 supplies commands SWDT, SCLK and XLAT to the command decode clock generating unit 40, while monitoring the serial signal SRDT by running software. The command decode clock generating circuit 40 decodes the commands SWDT, SCLK and XLAT received from the MCU 17, thereby generating a maximum-control signal SPLT, a selection signal SEL, a command signal SCD, and a control-switching signal SSW.

The VS control unit 49 generates a drive voltage VS, based on the following signals: the pulse-width modulation signal received from the PWM circuit 47; the edge-interval signal FEI received from the delay circuit 39; the signals SPF and XWL received from the CLV servo circuit 13; the mask-set signal XMS received from the phase switching unit 33; the edge detection signal XEG received from the edge detecting unit 31; and the maximum-control signal SPLT, the selection signal SEL and the command signal SCD received from the command decode clock generating unit 40. The VS control unit 49 delivers this drive voltage VS to the motor driver 10.

In accordance with the control switching signal SSW received from the command decode clock generating unit 40, the VS control unit 49 also serves to turn on and off a function that is called "soft-switching control", which lowers the maximum value of the drive voltage at the time of phase switching.

The speed computing circuit 91 computes the speed of rotation of the motor rotor based on the edge-interval signal FEI supplied from the delay unit 39. The speed computing circuit 91 outputs an automatic-switching signal ASS which takes a high level (H) and a low level (L), respectively, when the computed rotation speed is lower than a predetermined threshold value and when the same is higher than the threshold speed.

Figure 13:
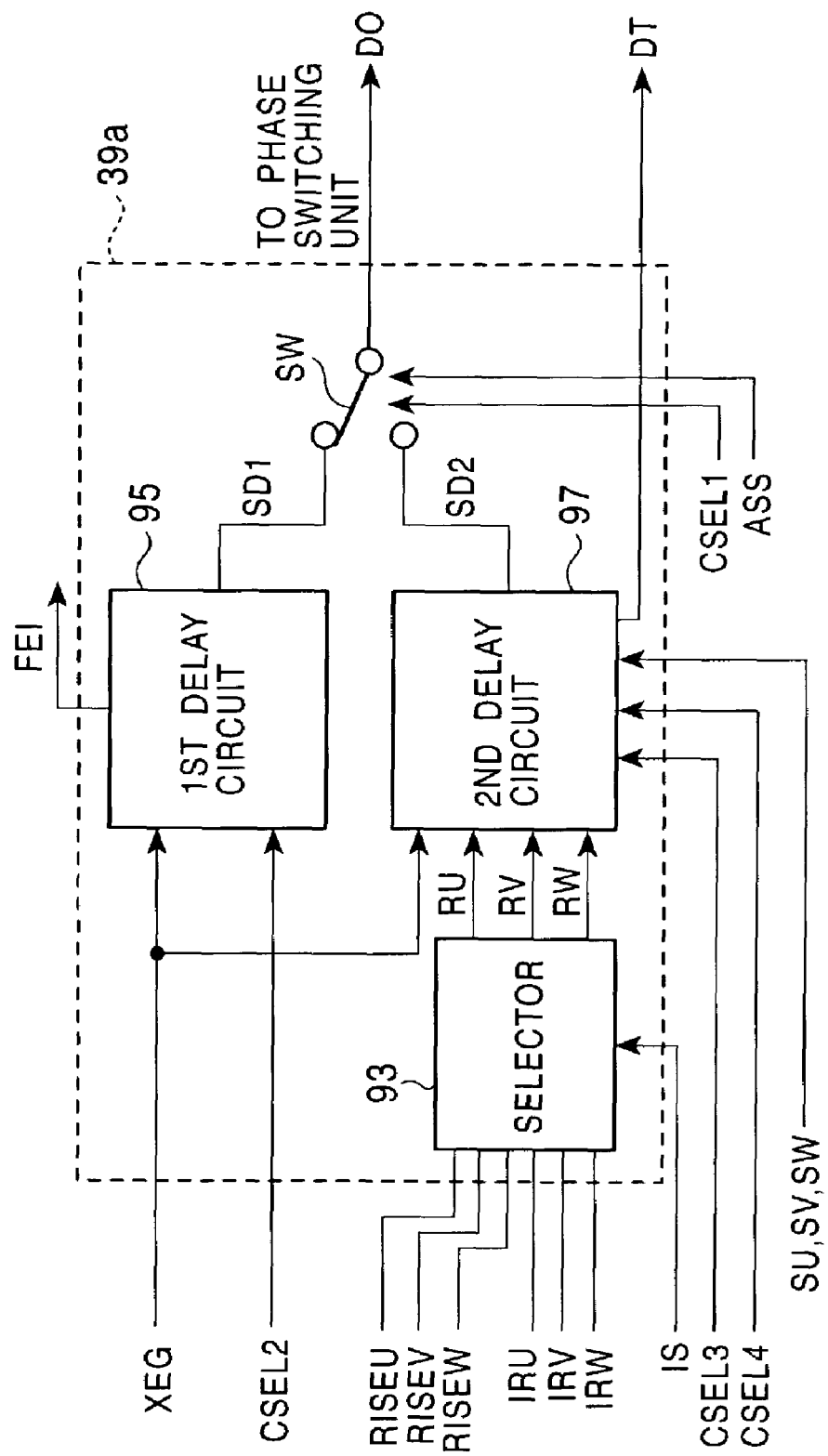
FIG. 13 is a diagram showing the configuration of a delay circuit of a delay unit included in the motor controller shown in FIG. 12.

FIG. 13 is a diagram showing the configuration of the delay circuit 39a included in the delay unit 39 shown in FIG. 12. As will be seen from FIG. 13, the delay circuit 39a includes a selector 93, a first delay circuit 95, a second delay circuit 97, and a switching circuit SW. The selector 93 is connected to the edge detecting unit 31 and also to the edge interpolation circuit 37. The first delay circuit 95 is connected to the edge detecting unit 31. The second delay circuit 97 is connected to the edge detecting unit 31, the selector 93, the command decode clock generating unit 40 and the phase switching unit 33. The switching circuit SW is connected to the first delay circuit 95, the second delay circuit 97, the command decode clock generating unit 40, and the speed computing circuit 91. The output of the switching circuit SW is connected to the phase switching unit 33.

In the delay circuit 39a having the described construction, the first delay circuit 95 generates and outputs an edge-interval signal FEI based on the edge-detection signal XEG supplied from the edge detecting unit 31. The first delay circuit 95 also generates a phase-switching signal SD1 and supplies the same to the switching circuit SW. The phase-switching signal SD1 is used as a signal for implementing the aforementioned control under the first delay mode.

The selector 93 is supplied with the signals RISEU, RISEV and RISEW coming from the edge detecting unit 31. The selector 93 also receives the interpolation signals IRU, IRV and IRW from the edge interpolation circuit 37, and selectively outputs either one of a signal group RISEU, RISEV, RISEW and an interpolation signal group IRU, IRV, IRW as the signals RU, RV, RW in accordance with a selection signal IS derived from the edge interpolation circuit 37. In accordance with the command signal supplied from the command decode clock generating unit 40, the second delay circuit 97 generates a phase-switching signal SD2 based on the signals received from the selector 93 and delivers this signal SD2 to the switching circuit SW. The second delay circuit 97 also generates a signal DT indicating a delay time and delivers this signal DT to the command decode clock generating circuit 40.

The phase-switching signal SD2 is used as a signal for implementing the aforementioned control under the second delay mode, while the signal DT is supplied to the MCU 17 and is used for monitoring the motor speed.

In accordance with a command-selection signal SELL received from the command decode clock generating unit 40 or the automatic-switching signal ASS supplied from the speed computing unit 91, the switching circuit SW selectively delivers to the phase switching unit 33 either the phase-switching signal SD1 generated by the first delay circuit 95 or the phase-switching signal SD2 generated by the second delay circuit 97. More specifically, when the automatic switching signal ASS received by the switching circuit SW is of the low level, the switching circuit SW selectively delivers the phase-switching signal SD1 so as to enable the control under the first delay mode, whereas when the received automatic-switching signal ASS is of the high level, the switching circuit SW selectively delivers the phase-switching signal SD2 so as to enable the control under the second delay mode.

Figure 14:
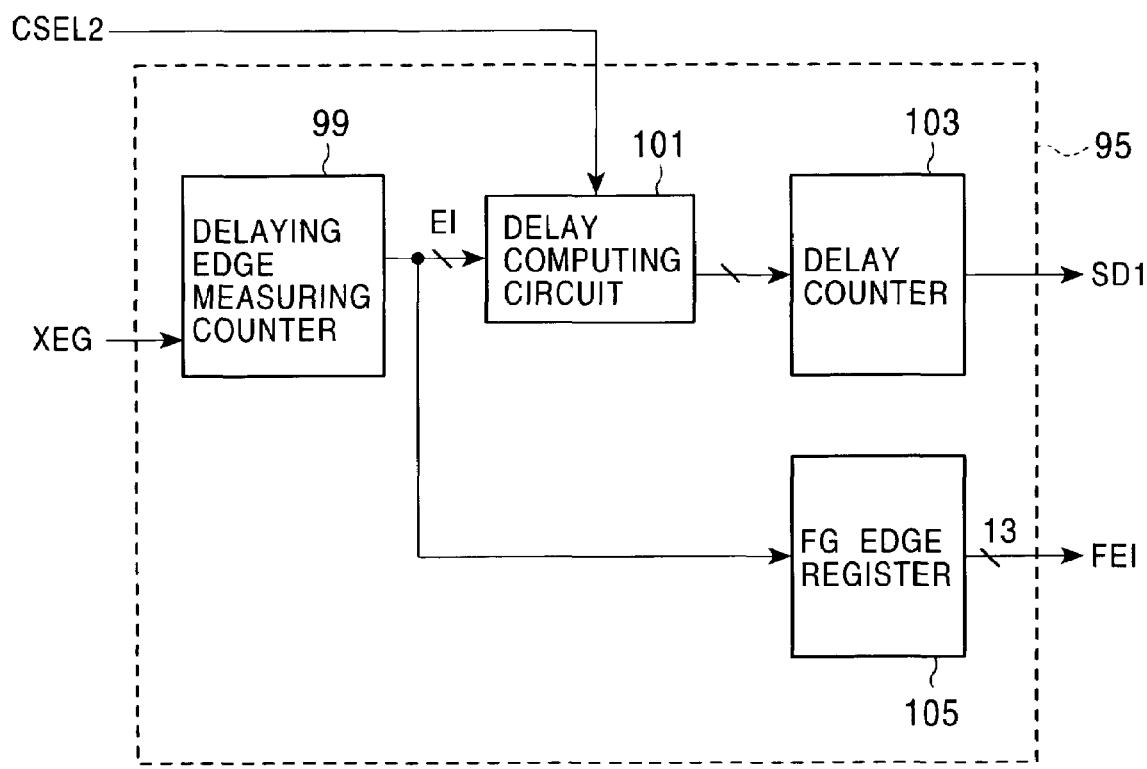
FIG. 14 is a block diagram showing the configuration of a first delay circuit included in the delay circuit shown in FIG. 13.

FIG. 14 is a block diagram showing the configuration of the first delay circuit 95 shown in FIG. 13. As will be seen from FIG. 14, the first delay circuit 95 includes a delaying edge measuring counter 99, a delay computing circuit 101, a delay counter 103, and an FG edge register 105.

The delaying edge measuring counter 99 is connected to the edge detecting unit 31, while the delay computing circuit 101 is connected to the delaying edge measuring counter 99. The delay counter 103 is connected to the delay computing circuit 101, while the FG edge register 105 is connected to the delaying edge measuring counter 99. The output of the delay counter 103 is connected to the switching circuit SW. The FG edge register 105 outputs an edge-interval signal FEI.

A description will now be given of the operation of the first delay circuit 95, with specific reference to FIG. 15. The delaying edge measuring counter 99 is loaded with the edge-detection signal XEG delivered thereto and measures the time interval between the edges. The delaying edge measuring counter 99 delivers the count value as data EI to the delay computing circuit 101 and the FG edge register 105.

The FG edge register 105 stores the data EI supplied thereto and supplies the edge-interval signal FEI corresponding to the data FEI to the command decode clock generating unit 40. As the command decode clock generating unit 40 supplies the MCU 17 with the signal representing the time interval between the edges, the MCU 17 can monitor the speed of rotation of the motor rotor based on this signal.

Figure 15:
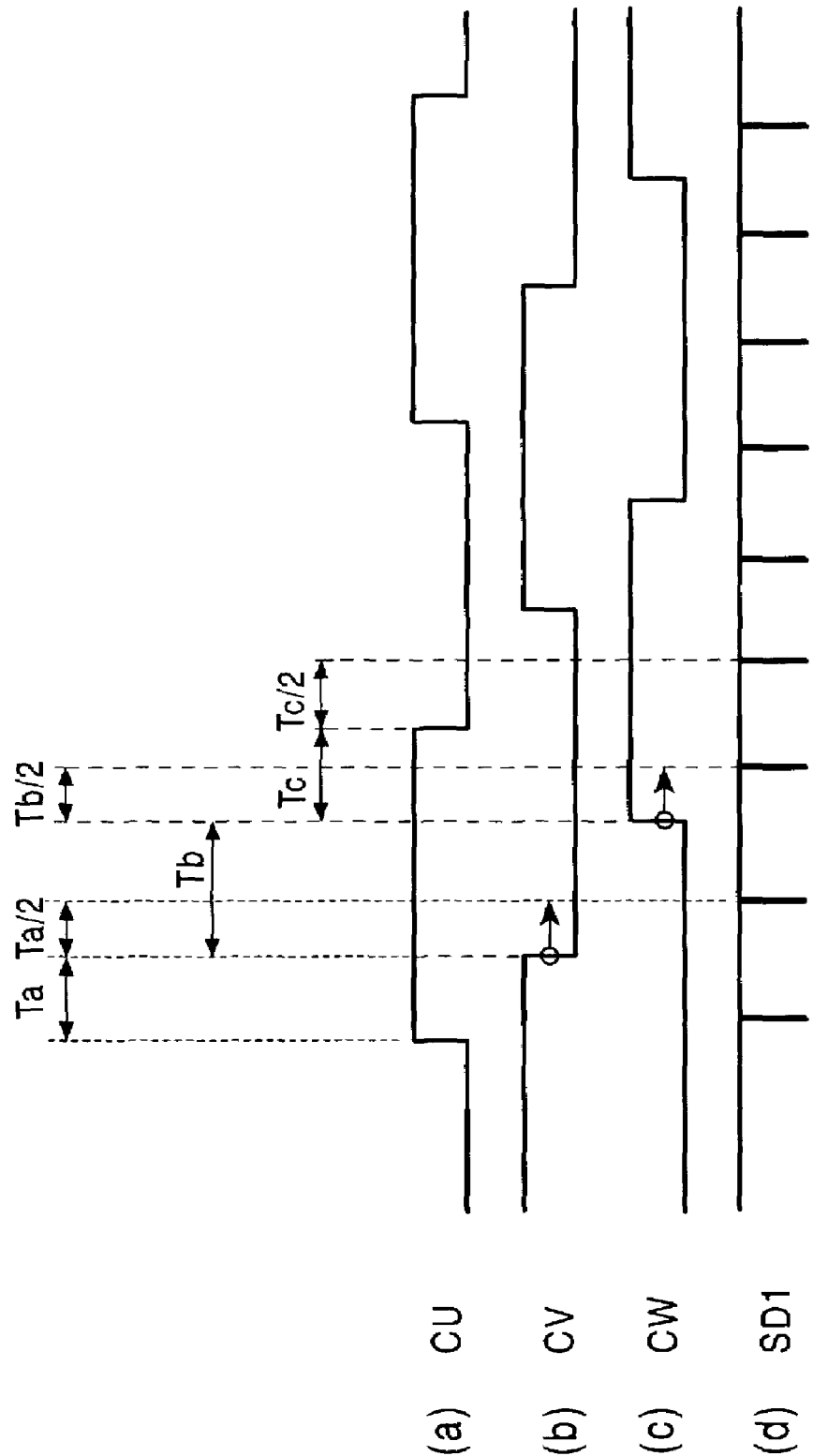
FIG. 15 is a timing chart showing the operation of the first delay circuit shown in FIG. 14.

In the meantime, the delay computing circuit 101 computes, in accordance with the data EI supplied thereto, the amounts of delay between the signals CU, CV and CW of the respective phases, i.e., the delay times Ta, Tb and Tc shown in FIG. 15. The delay computing circuit 101 then determines the timing at which the phase-switching signal SD1 indicative of the timing of phase switching is to be activated to the low level.

More specifically, the delay computing circuit 101 computes the delay times Ta/2, Tb/2 and Tc/2 from the timings of transition of the signals CU, CV and CW until the moments at which the phase-switching signal SD1 is activated to the low level. The coefficient "½" in the illustrated embodiment is selected in accordance with the command selection signal CSEL2 supplied to the delay computing circuit 101. The delay computing circuit 101 will be described later in detail.

The delay counter 103 counts the delay times computed by the delay computing circuit 101, i.e., the delay times Ta/2, Tb/2 and Tc/2 in the illustrated embodiment, and generates a phase-switching signal SD1, as shown in section (d) of FIG. 15. In the above-described first delay mode, the phase-switching signal SD1 is supplied as a signal DO to the phase switching unit 33. The phase switching unit 33 controls the switching of the logical-drive signals DU, DV and DW in accordance with the signal DO.

Figure 16:
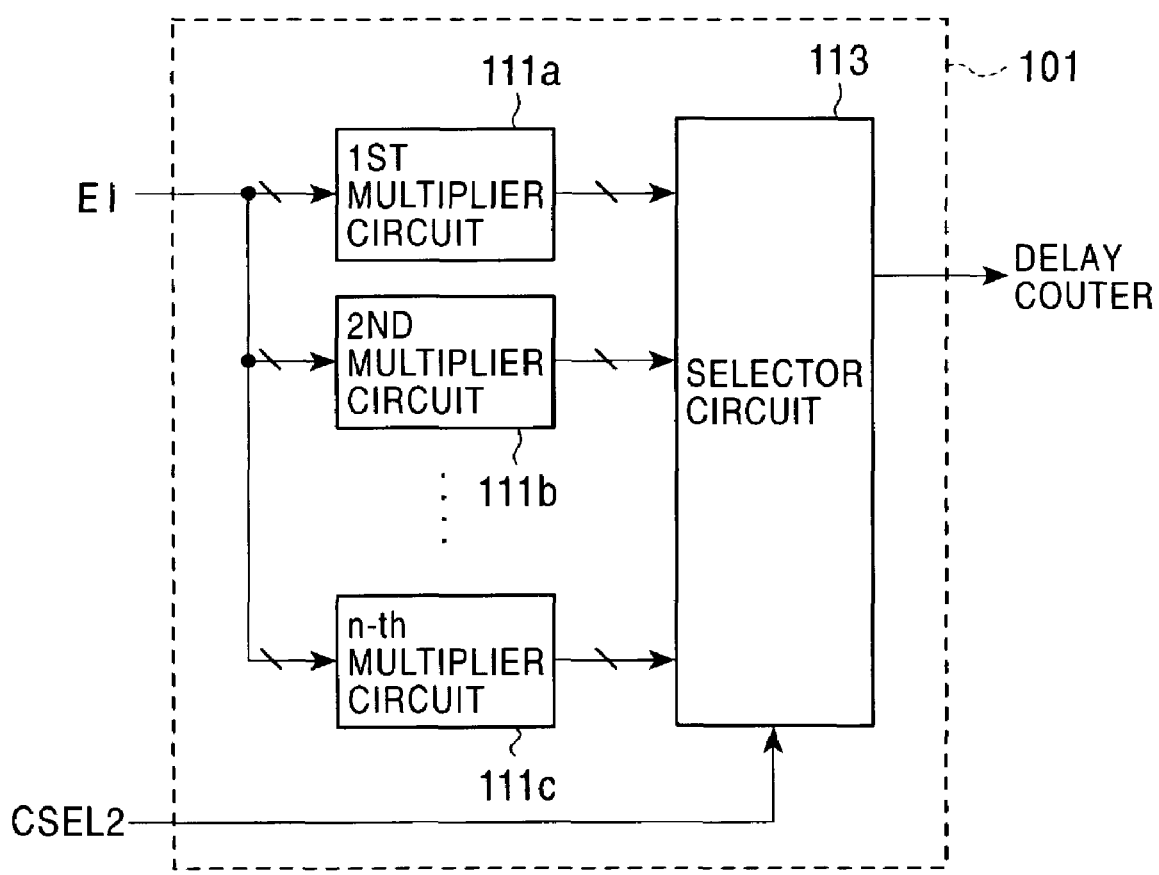
FIG. 16 is a block diagram showing the configuration of a delay-computing circuit included in the first delay circuit shown in FIG. 14.

FIG. 16 is a block diagram showing the configuration of the delay-computing circuit shown in FIG. 14. As will be seen from FIG. 16, the delay computing circuit 101 includes first to n-th multiplier circuits 111a to 111c connected in parallel to the delaying edge measuring counter 99 and a selector circuit 113 connected to the first to n-th multiplier circuits 111a to 111c and also to the command data clock generating unit 40. The output of the selector circuit 113 is connected to the delay counter 103.

The first multiplier circuit 111a shown in FIG. 16 performs a bit-by-bit shift of the supplied data EI indicative of the time interval of the edges, i.e., a bit shift, thereby delivering to the selector circuit 113 data having a value that is obtained by multiplying the time interval by ½. Likewise, the second multiplier circuit 111b shown in FIG. 16 performs shifting of the supplied data EI indicative of the time interval between the edges by every two bits, thereby delivering to the selector circuit 113 data having a value that is obtained by multiplying the time interval by ¼. In this way, the n-th multiplier circuit 111c delivers to the selector circuit 113 data having a value that is obtained by multiplying the time interval by n/m, where n and m are arbitrary natural numbers.

In accordance with the command-selection signal CSEL2 received from the command decode clock generating unit 40, the selector circuit 113 selectively outputs data received from the first to n-th multiplier circuits 111a to 111c.

Figure 17:
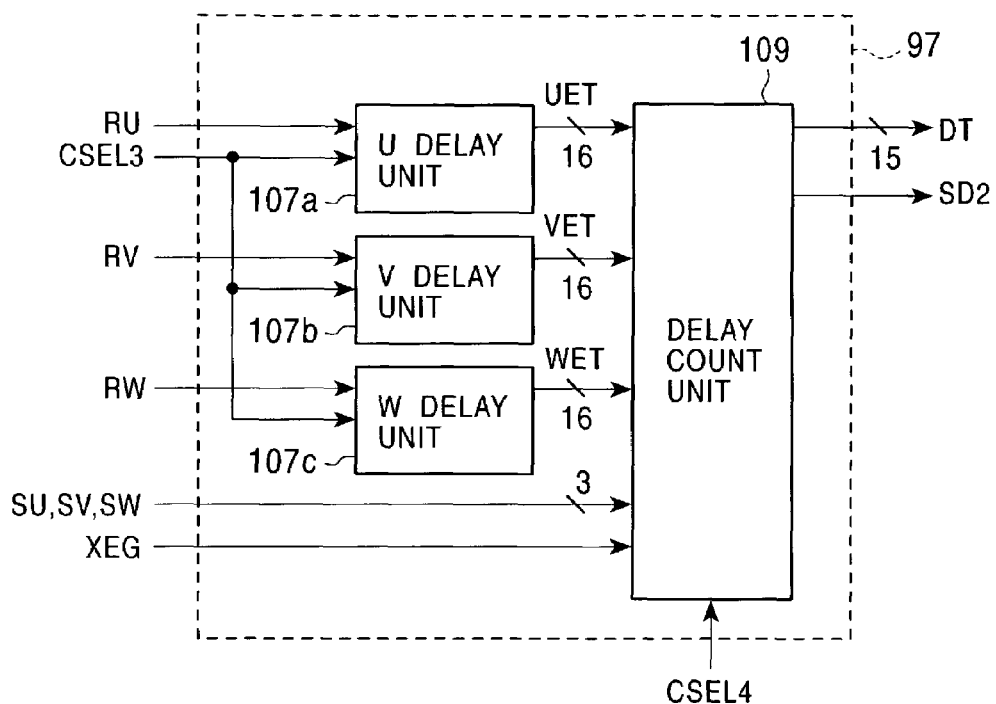
FIG. 17 is a block diagram showing the configuration of a second delay circuit included in the delay circuit shown in FIG. 13.

A description will now be given of the second delay circuit 97, which is shown in FIG. 13. FIG. 17 is a block diagram showing the configuration of the second delay circuit 97 shown in FIG. 13. As will be seen from FIG. 17, the second delay circuit 97 includes an U delay unit 107a, a V delay unit 107b, and a W delay unit 107c, which are arranged in parallel with one another, and a delay count unit 109. The U delay unit 107a is supplied with a signal RU from the selector 93. The V delay unit 107b is supplied with a signal RV from the selector 93. The W delay unit 107c is supplied with a signal RW from the selector 93.

A command-selection signal CSEL3 is supplied from the command decode clock generating unit 40 to the U delay unit 107a, the V delay unit 107b, and the W delay unit 107c. The delay count unit 109 is connected to the U delay unit 107a, V delay unit 107b and the W delay unit 107c and is supplied with signals SU, SV and SW coming from the phase switching unit 33. The delay count unit 109 also is supplied with the edge detection signal XEG from the edge detecting unit 31 and a command-selection signal CSEL4 from the command decode clock generating unit 40.

In the second delay circuit 97 having the described configuration, the U delay unit 107a, the V delay unit 107b and the W delay unit 107c respectively measure the time intervals between successive rises (transition from low level to high level) or successive falls (transition from high level to low level) of the signals CU, CV and CW, as will be described later in detail.

The delay count unit 109 selectively counts the above-mentioned time intervals measured by the U delay unit 107a, V delay unit 107b and the W delay unit 107c, based on the signals SU, SV and SW. Based on the results of the counting, the delay count unit 109 generates a phase-switching signal SD2 which shows the timing of switching of the phase and delivers this phase-switching signal SD2 to the switching circuit SW, while outputting a signal DT indicating the above-mentioned time intervals. Further detail of the delay count unit 109 will be described later.

Figure 18:
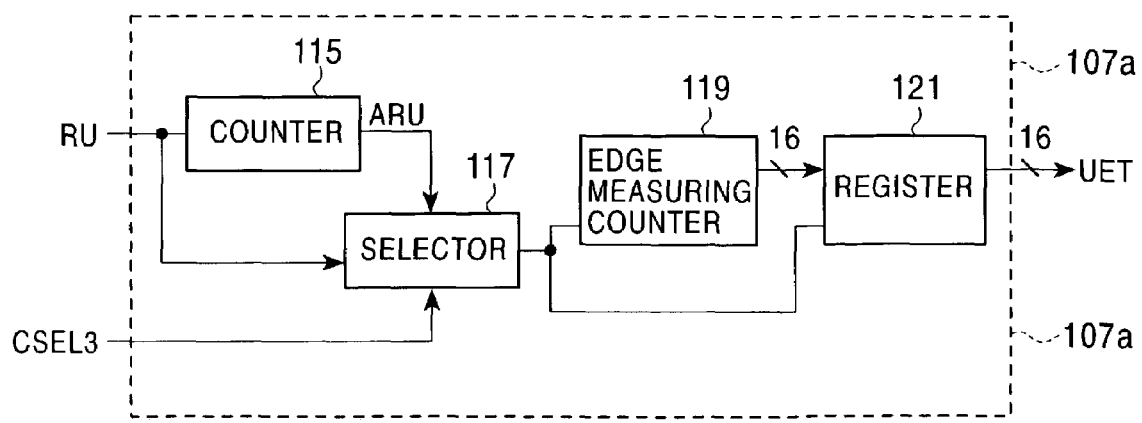
FIG. 18 is a block diagram showing the configuration of a U delay unit included in the second delay circuit of FIG. 13.

FIG. 18 is a diagram showing the configuration of the U delay unit 107a shown in FIG. 17. The V delay unit 107b and the W delay unit 107c, both shown in FIG. 17, have configurations substantially the same as that of the U delay unit 107a shown in FIG. 18.

As will be seen from FIG. 18, the U delay unit 107a includes a counter 115, a selector 117, an edge measuring counter 119 and a register 121. The counter 115 is connected to the selector 93. The selector 117 is connected to the counter 115, the selector 93 and the command decode clock generating unit 40. The edge measuring counter 119 is connected to the selector 117, while the register 121 is connected to the edge measuring counter 119 and also the selector 117.

In the U delay unit 107a having the described configuration, the counter 115 supplies the selector 117 with an activated signal ARU upon detection of, for example, two edges of the supplied signal RU. The selector 117 selectively delivers the signal RU or the signal ARU in accordance with the command-selection signal CSEL3 supplied thereto.

The edge measuring counter 119 measures the edge time interval corresponding to the signal supplied thereto. More specifically, upon receipt of the signal RU, the edge measuring counter 119 measures one cycle time or period Tun of the signal CU shown in section (a) of FIG. 20 and, upon receipt of the signal ARU, measures the time corresponding to two periods of the signal CU.

The register 121 stores a signal that is received from the edge measuring counter 119 and which indicates the results of the measurement and supplies the delay count unit 109 with a signal UET which indicates the above-mentioned period of the signal CU. Likewise, the V delay unit 107b and the W delay unit 107c supply the delay count unit 109 with a signal indicating the period of the signal CV and a signal WET indicating the period of the signal CW, respectively.

Figure 19:
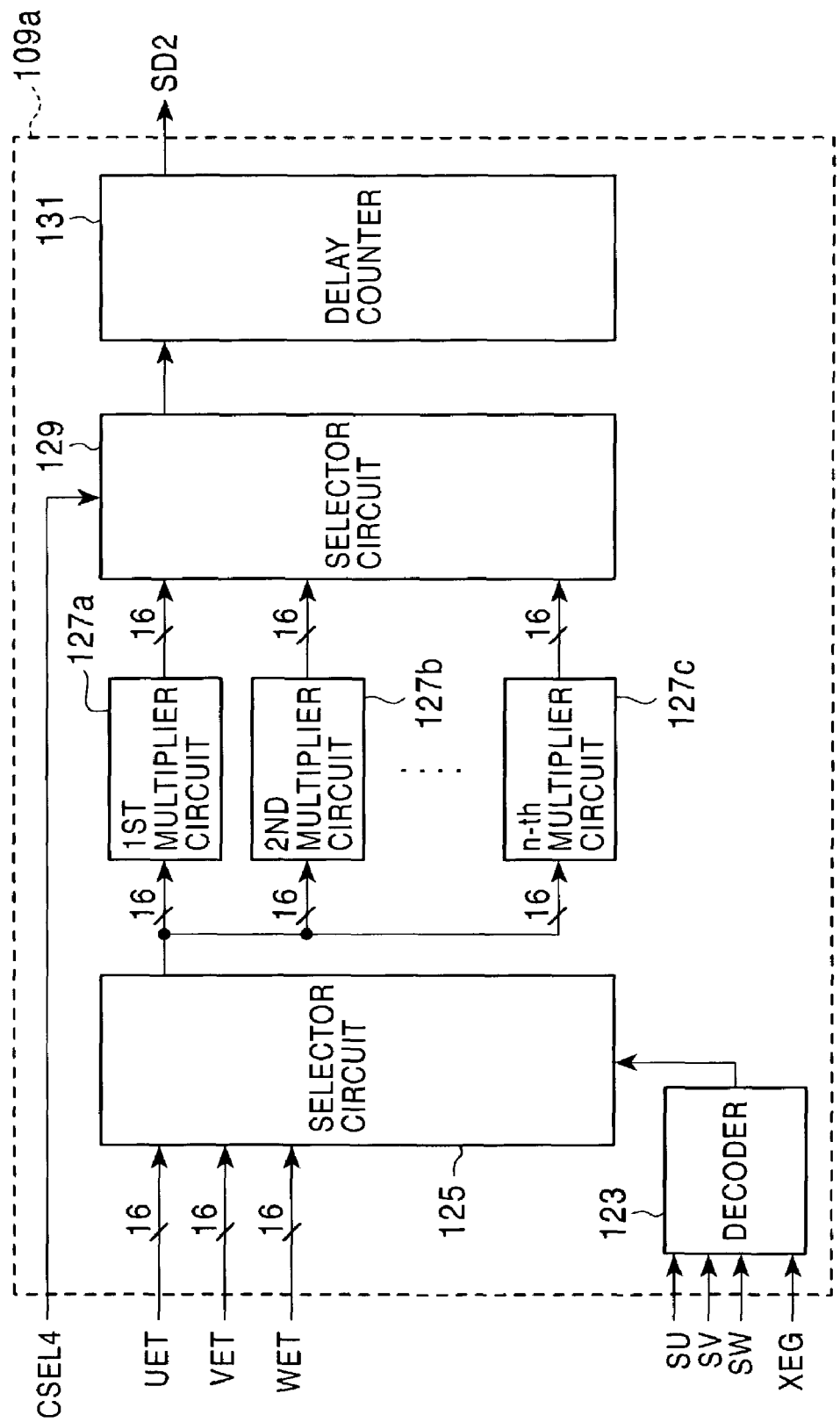
FIG. 19 is a block diagram showing the configuration of a phase-switching, signal-generating circuit contained in the delay-count unit of the circuit shown in FIG. 17.

FIG. 19 is a block diagram showing the configuration of a phase switching signal generating circuit 109a that is included in the delay count unit 109 shown in FIG. 17. As will be seen from FIG. 19, the phase switching signal generating circuit 109a includes a decoder 123, selector circuits 125 and 129, first to n-th multiplier circuits 127a to 127c, and a delay counter 131.

The decoder 123 is connected to the phase switching circuit 33 and also the edge detecting unit 31. The selector circuit 125 is connected to the U delay unit 107a, the V delay unit 107b, the W delay unit 107c and the decoder 123. The first to n-th multiplier circuits 127a to 127c are connected to the selector circuit 125 in parallel with one another. The selector circuit 129 is connected to these multiplier circuits 127a to 127c and the command decode clock generating unit 40. The delay counter 131 is connected to the selector circuit 129.

In the arrangement described above, the decoder 123 decodes the signals SU, SV and SW supplied thereto, as well as the edge detection signal XEG, and supplies the resultant decode signal to the selector circuit 125. The selector circuit 125 selectively outputs one of signals UET, VET and WET in accordance with the above-mentioned decode signal supplied thereto.

The first multiplier circuit 127a performs a bit-by-bit shift of the data received from the selector circuit 125, thus multiplying the data by ½, and delivers the multiplication result to the selector circuit 129. The second multiplier circuit 127b performs a 2-bit shift of the data received from the selector circuit 125, thus multiplying the data by ¼, and delivers the multiplication result to the selector circuit 129. Likewise, the n-th multiplier circuit 127c performs a shift of the data received from the selector circuit 125 by n bits, thus multiplying the data by q/p, and delivers the multiplication result to the selector circuit 129, where p and q are arbitrary natural numbers.

In accordance with the command-select signal CSEL4 supplied from the command decode clock generating unit 40, the selector circuit 129 selectively delivers to the delay counter 131 the multiplication results that are received from the first to n-th multiplier circuits 127a to 127c. The delay counter 131 counts the time represented by the signal received from the selector circuit 129, thereby generating the phase-switching signal SD2, which is activated to low level at a proper timing.

By way of example, section (d) of FIG. 20 shows the phase switching signal SD2 activated to a low level at timings delayed by time lengths corresponding to ¹/₁₂ of the periods Tun, Tvn and Twn of the signals CU, CV and CW from the timings of transition of the signals CU, CV and CW, as obtained by the use of the results of multiplications performed by the first to n-th multiplier circuits 127a to 127c.

As will be understood from the foregoing description, the disk drive apparatus of this embodiment has the first delay circuit 95, which generates the phase-switching signal SD1 necessary for the motor control under the first delay mode, and a second delay circuit 97, which generates the phase-switching signal SD2 necessary for the motor control under the second delay mode. Thus, either the phase-switching signal SD1 or the switching signal SD2 is selectively supplied to the phase switching unit 33 in accordance with the automatic-switching signal SWW supplied by the speed computing circuit 91 or the command-selection signal CSEL1 supplied from the MCU 17.

More specifically, referring to FIG. 21, a rise in the motor speed causes the edge interval Tuv between the edges of the signals CU and CV shown in sections (a) and (b) of FIG. 21 to fall below a predetermined threshold at a moment Tcr. At this moment Tcr, the speed computing circuit 91 changes the logical level of the automatic switching signal ASS which is to be output therefrom from the high level to the low level.

Therefore, the signal DO for the phase switching is generated under the second delay mode up to the moment Tcr, and, after the moment Tcr, the signal DO is generated under the first delay mode.

Therefore, when the rotation speed of the rotor of the spindle motor 3 is lower than a predetermined speed, the spindle motor 3 is controlled under the second delay mode, in order to suppress any influence of fluctuation of the inter-phase offsets. In contrast, when the rotor of the spindle motor 3 rotates at a speed exceeding the predetermined speed, the spindle motor 3 is controlled under the first delay mode, so that the rotational position information on the motor rotor is detected without delay.

Meanwhile, the MCU 17 delivers to the motor controller a command corresponding to the rotation speed of the rotor of the spindle motor 3, whereby the spindle motor 3 is optimally controlled in accordance with the rotation speed.

From the foregoing description, it will be understood that the disk drive apparatus of this embodiment effectively suppresses any inferior control of the motor rotation that may be caused by a process fluctuation occurring in the mass-production of the motor driver 10, thus contributing to an improvement in the process yield.

When the motor speed is high, or when the motor is abruptly accelerated or decelerated, the spindle motor 3 is controlled under the first delay mode, which permits quick detection of rotational position information on the motor, and whereby the motor control can be performed with higher accuracy.

As has been described, the illustrated embodiment permits the mode of motor control by a command issued from the MCU 17, so that the delay mode can be changed easily by the use of software.

Further, the illustrated embodiment performs automatic switching of the motor-control mode by means of the automatic-switching signal ASS that is generated by the speed computing unit 91 and which corresponds to the motor speed. This contributes to a reduction of the burden on the software which runs on the MCU 17, offering further advantages such as a reduction in the size of a ROM or a RAM that stores coded software, and leading to a reduction in the cost of production.

The speed computing circuit 91 for switching the delay mode is implemented by the digital circuit in the system LSI. It is therefore possible to enhance the scale of integration of the circuit without difficulty, which also affords reduction of the production cost.

As will be realized from the foregoing description, the disk drive apparatus of the present invention offers various advantages. First of all, it is to be noted that the circuit scale and the production cost are reduced by virtue of the drive-voltage control means, which can easily and reliably decrease the drive voltage at the timing of phase switching.

It also is to be noted that the disk drive apparatus of the present invention enhances the versatility of the motor-control method because of the ease of control of the drive voltage realized by the use of the software.

The disk drive apparatus of the present invention permits the spindle motor to be controlled in accordance with the first timing signal or the second timing signal, in accordance with the speed of rotation. Therefore, the motor control is optimized regardless of the state of operation of the motor, with the result that the reliability of the disk drive apparatus is further improved.

What is claimed is:

1. A disk drive apparatus for driving, by means of a motor, a disk mounted thereon so as to reproduce signals recorded in said disk, comprising:
    edge signal generating means for generating, in accordance with a plurality of voltages induced when said motor is driven, edge signals indicating a switch timing among phases of the voltages; and
    drive voltage control means for controlling, in accordance with said edge signals, the maximum value of a drive voltage for driving said motor, wherein said drive voltage control means includes:
    transition period computing means for computing transition period of said maximum value, based on an interval between the edge signals;
    timing control means for controlling, in accordance with said edge signals, at least the timing of a start of transition of said maximum value or the timing of an end of transition of said maximum value;
    a maximum limiter value determining circuit which generates a limiter signal that suppresses the attracting and repulsion forces acting between a rotor and a stator of said motor; and
    a maximum value limiting circuit that outputs the drive voltage at a level below said maximum value based on the generated limiter signal, wherein said drive voltage control means controls said maximum value based on the timing of the start or the end of the transition and said transition period.

2. The disk drive apparatus according to claim 1, wherein said drive voltage control means causes transition of said maximum value between two different levels, and includes transition pattern selecting means for setting, in accordance with a command supplied thereto, the time of transition of said maximum value between said two levels to a constant value or to a variable value.

3. The disk drive apparatus according to claim 1, wherein said drive voltage control means includes selecting means for selecting, in accordance with a command supplied thereto, a mode where said maximum value is subjected to soft switching control or another mode where said maximum value is kept constant.

4. A disk drive apparatus for driving, by means of a motor, a disk mounted thereon so as to reproduce signals recorded in said disk, comprising:
    edge signal generating means for generating, in accordance with a plurality of voltages induced when said motor is driven, edge signals indicating a switch timing among phases of the voltages; and
    drive voltage control means for controlling, in accordance with said edge signals, the maximum value of a drive voltage for driving said motor, wherein said drive voltage control means includes:
    transition period computing means for computing transition period of said maximum value, based on an interval between the edge signals; and
    timing control means for controlling, in accordance with said edge signals, at least the timing of a start of transition of said maximum value or the timing of an end of transition of said maximum value,
    wherein said drive voltage control means includes a limiter circuit for limiting, based on said edge signals, said drive voltage to a value not exceeding a predetermined value.

5. The disk drive apparatus according to claim 4, wherein said drive voltage control means causes transition of said maximum value between two different levels, and includes transition pattern selecting means for setting, in accordance with a command supplied thereto, the time of transition of said maximum value between said two levels to a constant value or to a variable value.

6. The disk drive apparatus according to claim 4, wherein said drive voltage control means includes selecting means for selecting, in accordance with a command supplied thereto, a mode where said maximum value is subjected to soft switching control or another mode where said maximum value is kept constant.

* * * * *